(12) United States Patent
Ozawa et al.

(10) Patent No.: US 10,157,636 B2
(45) Date of Patent: Dec. 18, 2018

(54) MAGNETIC TAPE DEVICE AND HEAD TRACKING SERVO METHOD

(71) Applicant: FUJIFILM Corporation, Tokyo (JP)

(72) Inventors: Eiki Ozawa, Minami-ashigara (JP); Norihito Kasada, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/920,563

(22) Filed: Mar. 14, 2018

(65) Prior Publication Data

US 2018/0286451 A1 Oct. 4, 2018

(30) Foreign Application Priority Data

Mar. 29, 2017 (JP) ................. 2017-065502

(51) Int. Cl.
| | | |
|---|---|---|
| *G11B 15/46* | (2006.01) | |
| *G11B 5/78* | (2006.01) | |
| *G11B 5/714* | (2006.01) | |
| *G11B 5/584* | (2006.01) | |
| *G11B 5/706* | (2006.01) | |
| *G11B 5/39* | (2006.01) | |
| *G11B 5/008* | (2006.01) | |

(52) U.S. Cl.
CPC .......... *G11B 5/714* (2013.01); *G11B 5/00813* (2013.01); *G11B 5/3909* (2013.01); *G11B 5/584* (2013.01); *G11B 5/70615* (2013.01)

(58) Field of Classification Search
CPC ..... G11B 5/6005; G11B 5/59633; G11B 5/54; G11B 19/06; G11B 19/28; G11B 2220/90; G11B 2220/20; G11B 15/52; G11B 15/1875; G11B 15/46; G11B 5/74; G11B 5/70; G11B 5/7305; G11B 5/855; G11B 5/82; G11B 5/743
USPC .............. 360/75, 73.01, 73.09, 134; 428/826
See application file for complete search history.

(56) References Cited

U.S. PATENT DOCUMENTS 6,835,461 B1 * 12/2004 Yamagata ................ G11B 5/73
264/288.4

FOREIGN PATENT DOCUMENTS

JP 2004-185676 A 7/2004

* cited by examiner

*Primary Examiner* — Nabil Hindi
(74) *Attorney, Agent, or Firm* — Sughrue Mion, PLLC

(57) ABSTRACT

The magnetic tape device includes a TMR head (servo head); and a magnetic tape, in which a magnetic layer of the magnetic tape includes fatty acid ester, Ra measured regarding a surface of the magnetic layer is equal to or smaller than 2.0 nm, full widths at half maximum of spacing distribution measured by optical interferometry regarding a surface of the magnetic layer before and after performing a vacuum heating with respect to the magnetic tape are greater than 0 nm and equal to or smaller than 7.0 nm, a difference between spacings before and after the vacuum heating is greater than 0 nm and equal to or smaller than 8.0 nm, and $\Delta$SFD ($=SFD_{25° C.}-SFD_{-190° C.}$) in a longitudinal direction of the magnetic tape is equal to or smaller than 0.50.

14 Claims, 2 Drawing Sheets

MAGNETIC TAPE DEVICE AND HEAD TRACKING SERVO METHOD

CROSS-REFERENCE TO RELATED APPLICATIONS

This application claims priority under 35 U.S.C 119 to Japanese Patent Application No. 2017-065502 filed on Mar. 29, 2017. The above application is hereby expressly incorporated by reference, in its entirety, into the present application.

BACKGROUND OF THE INVENTION

1. Field of the Invention

The present invention relates to a magnetic tape device and a head tracking servo method.

2. Description of the Related Art

Magnetic recording is used as a method of recording information on a recording medium. In the magnetic recording, information is recorded on a magnetic recording medium as a magnetized pattern. Information recorded on a magnetic recording medium is reproduced by reading a magnetic signal obtained from the magnetized pattern by a magnetic head. As a magnetic head used for such reproducing, various magnetic heads have been proposed (for example, see JP2004-185676A).

SUMMARY OF THE INVENTION

An increase in recording capacity (high capacity) of a magnetic recording medium is required in accordance with a great increase in information content in recent years. As means for realizing high capacity, a technology of increasing a recording density of a magnetic recording medium is used. However, as the recording density increases, a magnetic signal (specifically, a leakage magnetic field) obtained from a magnetic layer tends to become weak. Accordingly, it is desired that a high-sensitivity magnetic head capable of reading a weak signal with excellent sensitivity is used as a reproducing head. Regarding the sensitivity of the magnetic head, it is said that a magnetoresistive (MR) head using a magnetoresistance effect as an operating principle has excellent sensitivity, compared to an inductive head used in the related art.

As the MR head, an anisotropic magnetoresistive (AMR) head and a giant magnetoresistive (GMR) head are known as disclosed in a paragraph 0003 of JP2004-185676A. The GMR head is an MR head having excellent sensitivity than that of the AMR head. In addition, a tunnel magnetoresistive (TMR) head disclosed in a paragraph 0004 and the like of JP2004-185676A is an MR head having a high possibility of realizing higher sensitivity.

Meanwhile, a recording and reproducing system of the magnetic recording is broadly divided into a levitation type and a sliding type. A magnetic recording medium in which information is recorded by the magnetic recording is broadly divided into a magnetic disk and a magnetic tape. Hereinafter, a drive including a magnetic disk as a magnetic recording medium is referred to as a "magnetic disk device" and a drive including a magnetic tape as a magnetic recording medium is referred to as a "magnetic tape device".

The magnetic disk device is generally called a hard disk drive (HDD) and a levitation type recording and reproducing system is used. In the magnetic disk device, a shape of a surface of a magnetic head slider facing a magnetic disk and a head suspension assembly that supports the magnetic head slider are designed so that a predetermined interval between a magnetic disk and a magnetic head can be maintained with air flow at the time of rotation of the magnetic disk. In such a magnetic disk device, information is recorded and reproduced in a state where the magnetic disk and the magnetic head do not come into contact with each other. The recording and reproducing system described above is the levitation type. On the other hand, a sliding type recording and reproducing system is used in the magnetic tape device. In the magnetic tape device, a surface of a magnetic layer of a magnetic tape and a magnetic head come into contact with each other and slide on each other, at the time of the recording and reproducing information.

JP2004-185676A proposes usage of the TMR head as a reproducing head for reproducing information in the magnetic disk device. On the other hand, the usage of the TMR head as a reproducing head in the magnetic tape device is currently still in a stage where the future usage thereof is expected, and the usage thereof is not yet practically realized.

However, in the magnetic tape, information is normally recorded on a data band of the magnetic tape. Accordingly, data tracks are formed in the data band. As means for realizing high capacity of the magnetic tape, a technology of disposing the larger amount of data tracks in a width direction of the magnetic tape by narrowing the width of the data track to increase recording density is used. However, in a case where the width of the data track is narrowed and the recording and/or reproduction of information is performed by transporting the magnetic tape in the magnetic tape device, it is difficult that a magnetic head properly follows the data tracks in accordance with the position change of the magnetic tape, and errors may easily occur at the time of recording and/or reproduction. Thus, as means for preventing occurrence of such errors, a method of forming a servo pattern in the magnetic layer and performing head tracking servo has been recently proposed and practically used. In a magnetic servo type head tracking servo among head tracking servos, a servo pattern is formed in a magnetic layer of a magnetic tape, and this servo pattern is read by a servo head to perform head tracking servo. The head tracking servo is to control a position of a magnetic head in the magnetic tape device. The head tracking servo is more specifically performed as follows.

First, a servo head reads a servo pattern to be formed in a magnetic layer (that is, reproduces a servo signal). A position of a magnetic head in a magnetic tape device is controlled in accordance with a value obtained by reading the servo pattern. Accordingly, in a case of transporting the magnetic tape in the magnetic tape device for recording and/or reproducing information, it is possible to increase an accuracy of the magnetic head following the data track, even in a case where the position of the magnetic tape is changed. For example, even in a case where the position of the magnetic tape is changed in the width direction with respect to the magnetic head, in a case of recording and/or reproducing information by transporting the magnetic tape in the magnetic tape device, it is possible to control the position of the magnetic head of the magnetic tape in the width direction in the magnetic tape device, by performing the head tracking servo. By doing so, it is possible to properly record information in the magnetic tape and/or properly reproduce information recorded on the magnetic tape in the magnetic tape device.

The servo pattern is formed by magnetizing a specific position of the magnetic layer. A plurality of regions including a servo pattern (referred to as "servo bands") are generally present in the magnetic tape capable of performing the head tracking servo along a longitudinal direction. A region interposed between two servo bands is referred to as a data band. The recording of information is performed on the data band and a plurality of data tracks are formed in each data band along the longitudinal direction. In order to realize high capacity of the magnetic tape, it is preferable that the larger number of the data bands which are regions where information is recorded are present in the magnetic layer. As means for that, a technology of increasing a percentage of the data bands occupying the magnetic layer by narrowing the width of the servo band which is not a region in which information is recorded is considered. In regards to this point, the inventors have considered that, since a read track width of the servo pattern becomes narrow, in a case where the width of the servo band becomes narrow, it is desired to use a magnetic head having high sensitivity as the servo head, in order to ensure reading accuracy of the servo pattern. As a magnetic head for this, the inventors focused on a TMR head which has been proposed to be used as a reproducing head in the magnetic disk device in JP2004-185676A. As described above, the usage of the TMR head in the magnetic tape device is still in a stage where the future use thereof as a reproducing head for reproducing information is expected, and the usage of the TMR head as the servo head has not even proposed yet. However, the inventors have thought that, it is possible to deal with realization of higher sensitivity of the future magnetic tape, in a case where the TMR head is used as the servo head in the magnetic tape device which performs the head tracking servo.

In addition, a signal-to-noise-ratio (SNR) at the time of reading the servo pattern tends to decrease in accordance with a decrease in read track width of the servo pattern. However, a decrease in SNR at the time of reading the servo pattern causes a decrease in accuracy that the magnetic head follows the data track by the head tracking servo.

Therefore, an object of the invention is to provide a magnetic tape device in which a TMR head is mounted as a servo head and a servo pattern written on a magnetic tape can be read at a high SNR.

As means for increasing the SNR at the time of reproducing information recorded on the magnetic tape, a method of increasing smoothness of a surface of a magnetic layer of a magnetic tape is used. This point is also preferable for increasing the SNR in a case of reading a servo pattern written in the magnetic tape. The inventors have made intensive studies for further increasing the SNR in a case of reading a servo pattern written in the magnetic tape, by using other methods, in addition to the method of increasing smoothness of a surface of a magnetic layer of a magnetic tape.

Meanwhile, a magnetoresistance effect which is an operating principle of the MR head such as the TMR head is a phenomenon in which electric resistance changes depending on a change in magnetic field. The MR head detects a change in leakage magnetic field generated from a magnetic recording medium as a change in resistance value (electric resistance) and reproduces information by converting the change in resistance value into a change in voltage. In a case where the TMR head is used as the servo head, the TMR head detects a change in leakage magnetic field generated from a magnetic layer in which the servo pattern is formed, as a change in resistance value (electric resistance) and reads the servo pattern (reproduces a servo signal) by converting the change in resistance value into a change in voltage. It is said that a resistance value in the TMR head is generally high, as disclosed in a paragraph 0007 of JP2004-185676A, but generation of a significant decrease in resistance value in the TMR head, while continuing the reading of a servo pattern with the TMR head, may cause a decrease in sensitivity of the TMR head, while continuing the head tracking servo. As a result, the accuracy of head position controlling of the head tracking servo may decrease, while continuing the head tracking servo.

During intensive studies for achieving the object described above, the inventors have found a phenomenon which was not known in the related art, in that, in a case of using the TMR head as a servo head in the magnetic tape device which performs the head tracking servo, a significant decrease in resistance value (electric resistance) occurs in the TMR head. A decrease in resistance value in the TMR head is a decrease in electric resistance measured by bringing an electric resistance measuring device into contact with a wiring connecting two electrodes configuring a tunnel magnetoresistance effect type element included in the TMR head. The phenomenon in which this resistance value significantly decreases is not observed in a case of using the TMR head in the magnetic disk device, nor in a case of using other MR heads such as the GMR head in the magnetic disk device or the magnetic tape device. That is, occurrence of a significant decrease in resistance value in the TMR head in a case of using the TMR head was not even confirmed in the related art. A difference in the recording and reproducing system between the magnetic disk device and the magnetic tape device, specifically, contact and non-contact between a magnetic recording medium and a magnetic head may be the reason why a significant decrease in resistance value in the TMR head occurred in the magnetic tape device is not observed in the magnetic disk device. In addition, the TMR head has a special structure in which two electrodes are provided with an insulating layer (tunnel barrier layer) interposed therebetween in a direction in which a magnetic tape is transported, which is not applied to other MR heads which are currently practically used, and it is considered that this is the reason why a significant decrease in resistance value occurring in the TMR head is not observed in other MR heads. It is clear that, a significant decrease in resistance value in the TMR head tends to more significantly occur in a magnetic tape device in which a magnetic tape having high smoothness of a surface of a magnetic layer is mounted as the magnetic tape. With respect to this, as a result of more intensive studies after finding the phenomenon described above, the inventors have newly found that such a significant decrease in resistance value can be prevented by using a magnetic tape described below as the magnetic tape.

One aspect of the invention has been completed based on the finding described above.

That is, according to one aspect of the invention, there is provided a magnetic tape device comprising: a magnetic tape; and a servo head, in which the servo head is a magnetic head (hereinafter, also referred to as a "TMR head") including a tunnel magnetoresistance effect type element (hereinafter, also referred to as a "TMR element") as a servo pattern reading element, the magnetic tape includes a non-magnetic support, and a magnetic layer including ferromagnetic powder, a binding agent, and fatty acid ester on the non-magnetic support, the magnetic layer includes the servo pattern, a center line average surface roughness Ra measured regarding a surface of the magnetic layer (hereinafter, also referred to as a "magnetic layer surface roughness Ra") is equal to or smaller than 2.0 nm, a full width at half maximum of spacing distribution measured by optical interferometry regarding the surface of the magnetic layer before performing a vacuum heating with respect to the magnetic tape (hereinafter, also referred to as "$FWHM_{before}$") is greater than 0 nm and equal to or smaller than 7.0 nm, a full width at half maximum of spacing distribution measured by optical interferometry regarding the surface of the magnetic layer after performing the vacuum heating with respect to the magnetic tape (hereinafter, also referred to as "$FWHM_{after}$") is greater than 0 nm and equal to or smaller than 7.0 nm, a difference ($S_{after}-S_{before}$) between a spacing $S_{after}$ measured by optical interferometry regarding the surface of the magnetic layer after performing the vacuum heating with respect to the magnetic tape and a spacing $S_{before}$ measured by optical interferometry regarding the surface of the magnetic layer before performing the vacuum heating with respect to the magnetic tape (hereinafter, also simply referred to as a "difference ($S_{after}-S_{before}$)") is greater than 0 nm and equal to or smaller than 8.0 nm, and ΔSFD in a longitudinal direction of the magnetic tape calculated by Expression 1 (hereinafter, also simply referred to as "ΔSFD"), $\Delta SFD = SFD_{25° C.} - SFD_{-190° C.}$ . . . Expression 1, is equal to or smaller than 0.50. In Expression 1, the $SFD_{25° C.}$ is a switching field distribution SFD measured in a longitudinal direction of the magnetic tape at a temperature of 25° C., and the $SFD_{-190° C.}$ is a switching field distribution SFD measured in a longitudinal direction of the magnetic tape at a temperature of −190° C.

According to another aspect of the invention, there is provided a head tracking servo method comprising: reading a servo pattern of a magnetic layer of a magnetic tape by a servo head in a magnetic tape device, in which the servo head is a magnetic head including a tunnel magnetoresistance effect type element as a servo pattern reading element, the magnetic tape includes a non-magnetic support, and a magnetic layer including ferromagnetic powder, a binding agent, and fatty acid ester on the non-magnetic support, the magnetic layer includes the servo pattern, a center line average surface roughness Ra measured regarding a surface of the magnetic layer is equal to or smaller than 2.0 nm, a full width at half maximum of spacing distribution measured by optical interferometry regarding the surface of the magnetic layer before performing a vacuum heating with respect to the magnetic tape is greater than 0 nm and equal to or smaller than 7.0 nm, a full width at half maximum of spacing distribution measured by optical interferometry regarding the surface of the magnetic layer after performing the vacuum heating with respect to the magnetic tape is greater than 0 nm and equal to or smaller than 7.0 nm, a difference ($S_{after}-S_{before}$) between a spacing $S_{after}$ measured by optical interferometry regarding the surface of the magnetic layer after performing the vacuum heating with respect to the magnetic tape and a spacing $S_{before}$ measured by optical interferometry regarding the surface of the magnetic layer before performing the vacuum heating with respect to the magnetic tape is greater than 0 nm and equal to or smaller than 8.0 nm, and ΔSFD in a longitudinal direction of the magnetic tape calculated by Expression 1 is equal to or smaller than 0.50.

In the invention and the specification, the "vacuum heating" of the magnetic tape is performed by holding the magnetic tape in an environment of a pressure of 200 Pa to 0.01 MPa and at an atmosphere temperature of 70° C. to 90° C. for 24 hours.

In the invention and the specification, the spacing measured by optical interferometry regarding the surface of the magnetic layer of the magnetic tape is a value measured by the following method. In the invention and the specification, the "surface of the magnetic layer" of the magnetic tape is identical to the surface of the magnetic tape on the magnetic layer side.

In a state where the magnetic tape and a transparent plate-shaped member (for example, glass plate or the like) are overlapped onto each other so that the surface of the magnetic layer of the magnetic tape faces the transparent plate-shaped member, a pressing member is pressed against the side of the magnetic tape opposite to the magnetic layer side at pressure of $5.05×10^4$ N/m (0.5 atm). In this state, the surface of the magnetic layer of the magnetic tape is irradiated with light through the transparent plate-shaped member (irradiation region: 150,000 to 200,000 $μm^2$), and a spacing (distance) between the surface of the magnetic layer of the magnetic tape and the surface of the transparent plate-shaped member on the magnetic tape side is acquired based on intensity (for example, contrast of interference fringe image) of interference light generated due to a difference in a light path between reflected light from the surface of the magnetic layer of the magnetic tape and reflected light from the surface of the transparent plate-shaped member on the magnetic tape side. The light emitted here is not particularly limited. In a case where the emitted light is light having an emission wavelength over a comparatively wide wavelength range as white light including light having a plurality of wavelengths, a member having a function of selectively cutting light having a specific wavelength or a wavelength other than wavelengths in a specific wavelength range, such as an interference filter, is disposed between the transparent plate-shaped member and a light reception unit which receives reflected light, and light at some wavelengths or in some wavelength ranges of the reflected light is selectively incident to the light reception unit. In a case where the light emitted is light (so-called monochromatic light) having a single luminescence peak, the member described above may not be used. The wavelength of light incident to the light reception unit can be set to be 500 to 700 nm, for example. However, the wavelength of light incident to the light reception unit is not limited to be in the range described above. In addition, the transparent plate-shaped member may be a member having transparency through which emitted light passes, to the extent that the magnetic tape is irradiated with light through this member and interference light is obtained.

The measurement described above can be performed by using a commercially available tape spacing analyzer (TSA) such as Tape Spacing Analyzer manufactured by Micro Physics, Inc., for example. The spacing measurement of the examples was performed by using Tape Spacing Analyzer manufactured by Micro Physics, Inc.

In addition, the full width at half maximum of spacing distribution of the invention and the specification is a full width at half maximum (FWHM), in a case where the interference fringe image obtained by the measurement of the spacing described above is divided into 300,000 points, a spacing of each point (distance between the surface of the magnetic layer of the magnetic tape and the surface of the transparent plate-shaped member on the magnetic tape side) is acquired, this spacing is shown with a histogram, and this histogram is fit with Gaussian distribution.

Further, the difference ($S_{after}-S_{before}$) is a value obtained by subtracting a mode before the vacuum heating from a mode after the vacuum heating of the 300,000 points.

One aspect of the magnetic tape device and the head tracking servo method is as follows.

In one aspect, the FWHM$_{before}$, is 3.0 nm to 7.0 nm.

In one aspect, the FWHM$_{after}$, is 3.0 nm to 7.0 nm.

In one aspect, the difference (S$_{after}$–S$_{before}$) is 2.0 nm to 8.0 nm.

In one aspect, the center line average surface roughness Ra measured regarding the surface of the magnetic layer is 1.2 nm to 2.0 nm.

In one aspect, the ΔSFD is 0.03 to 0.50.

In one aspect, the magnetic tape includes a non-magnetic layer including non-magnetic powder and a binding agent between the non-magnetic support and the magnetic layer.

According to one aspect of the invention, it is possible to perform the reading at a high SNR, in a case of reading a servo pattern of the magnetic layer of the magnetic tape with the TMR head and prevent occurrence of a significant decrease in resistance value in the TMR head.

DESCRIPTION OF THE PREFERRED EMBODIMENTS

Magnetic Tape Device

Figure 1:
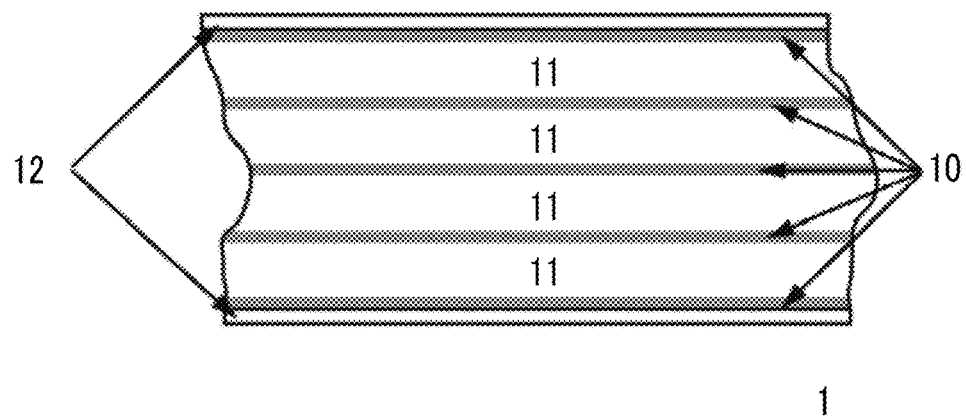
FIG. 1 shows an example of disposition of data bands and servo bands.

One aspect of the invention relates to a magnetic tape device including: a magnetic tape; and a servo head, in which the servo head is a magnetic head including a tunnel magnetoresistance effect type element as a servo pattern reading element, the magnetic tape includes a non-magnetic support, and a magnetic layer including ferromagnetic powder, a binding agent, and fatty acid ester on the non-magnetic support, the magnetic layer includes a servo pattern, a center line average surface roughness Ra measured regarding a surface of the magnetic layer (magnetic layer surface roughness Ra) is equal to or smaller than 2.0 nm, a full width at half maximum of spacing distribution measured by optical interferometry regarding the surface of the magnetic layer before performing a vacuum heating with respect to the magnetic tape (FWHM$_{before}$) is greater than 0 nm and equal to or smaller than 7.0 nm, a full width at half maximum of spacing distribution measured by optical interferometry regarding the surface of the magnetic layer after performing the vacuum heating with respect to the magnetic tape (FWHM$_{after}$) is greater than 0 nm and equal to or smaller than 7.0 nm, a difference (S$_{after}$–S$_{before}$) between a spacing Sit measured by optical interferometry regarding the surface of the magnetic layer after performing the vacuum heating with respect to the magnetic tape and a spacing S$_{before}$ measured by optical interferometry regarding the surface of the magnetic layer before performing the vacuum heating with respect to the magnetic tape is greater than 0 nm and equal to or smaller than 8.0 nm, and ΔSFD in a longitudinal direction of the magnetic tape calculated by Expression 1 is equal to or smaller than 0.50.

The inventors have thought that the magnetic layer surface roughness Ra and the ΔSFD set to be in the ranges described above contribute to the reading of a servo pattern written in the magnetic layer of the magnetic tape in the magnetic tape device at a high SNR, and the FWHM$_{before}$, the FWHM$_{after}$, and the difference (S$_{after}$–S$_{before}$) set to be in the range described above contributes to the prevention of a significant decrease in resistance value in the TMR head.

The magnetic layer surface roughness Ra equal to or smaller than 2.0 nm can contribute to a decrease in spacing loss causing a decrease in SNR. In addition, the ΔSFD equal to or smaller than 0.50 also contribute to improvement of the SNR. It is thought that the ΔSFD is a value which may be an index for a state of ferromagnetic powder present in the magnetic layer. It is surmised that, a state in which the ΔSFD is equal to or smaller than 0.50 is a state in which particles of ferromagnetic powder is suitably aligned and present in the magnetic layer, and such a state contributes to the reading of a servo pattern written in the magnetic layer at a high SNR.

The above description is a surmise of the inventors regarding the reading of a servo pattern written in the magnetic layer of the magnetic tape at a high SNR, in the magnetic tape device. The inventors have thought regarding the usage of the TMR head by preventing the occurrence of a significant decrease in resistance value, in the magnetic tape, as follows.

In the magnetic tape device, in a case of using a magnetic tape of the related art, in a case of using a TMR head as a servo head for performing head tracking servo at the time of recording and/or reproducing information, a phenomenon in which a resistance value (electric resistance) significantly decreases in the TMR head occurs. This phenomenon is a phenomenon that is newly found by the inventors. The inventors have considered the reason for the occurrence of such a phenomenon is as follows.

The TMR head is a magnetic head using a tunnel magnetoresistance effect and includes two electrodes with an insulating layer (tunnel barrier layer) interposed therebetween. The tunnel barrier layer positioned between the two electrodes is an insulating layer, and thus, even in a case where a voltage is applied between the two electrodes, in general, a current does not flow or does not substantially flow between the electrodes. However, a current (tunnel current) flows by a tunnel effect depending on a direction of a magnetic field of a free layer affected by a leakage magnetic field from the magnetic tape, and a change in amount of a tunnel current flow is detected as a change in resistance value by the tunnel magnetoresistance effect. By converting the change in resistance value into a change in voltage, a servo pattern formed in the magnetic tape can be read (a servo signal can be reproduced).

Examples of a structure of the MR head include a current-in-plane (CIP) structure and a current-perpendicular-to-plane (CPP) structure, and the TMR head is a magnetic head having a CPP structure. In the MR head having a CPP structure, a current flows in a direction perpendicular to a film surface of an MR element, that is, a direction in which the magnetic tape is transported, in a case of reading a servo pattern formed in the magnetic tape. With respect to this, other MR heads, for example, a spin valve type GMR head which is widely used in recent years among the GMR heads has a CIP structure. In the MR head having a CIP structure, a current flows in a direction in a film plane of an MR element, that is, a direction perpendicular to a direction in which the magnetic tape is transported, in a case of reading a servo pattern formed in the magnetic tape.

As described above, the TMR head has a special structure which is not applied to other MR heads which are currently practically used. Accordingly, in a case where short circuit (bypass due to damage) occurs even at one portion between the two electrodes, the resistance value significantly decreases. A significant decrease in resistance value in a case of the short circuit occurred even at one portion between the two electrodes as described above is a phenomenon which does not occur in other MR heads. In the magnetic disk device using a levitation type recording and reproducing system, a magnetic disk and a magnetic head do not come into contact with each other, and thus, damage causing short circuit hardly occurs. On the other hand, in the magnetic tape device using a sliding type recording and reproducing system, the magnetic tape and the servo head come into contact with each other and slide on each other, in a case of reading a servo pattern by the servo head. Accordingly, in a case where any measures are not prepared, the TMR head is damaged due to the sliding between the TMR head and the magnetic tape, and thus, short circuit easily occurs. The inventors have assumed that this is the reason why a decrease in resistance value of the TMR head significantly occurs, in a case of using the TMR head as the servo head in the magnetic tape device. In addition, it is thought that, in a case where the smoothness of the surface of the magnetic layer of the magnetic tape increases, a contact area (so-called real contact area) between the surface of the magnetic layer and the servo head increases. It is thought that the servo head which is more easily damaged at the time of sliding on the magnetic tape due to an increase in contact area, is a reason a decrease in resistance value in the TMR head which tends to be significant, in the magnetic tape device in which the magnetic tape having high smoothness of the surface of the magnetic layer is mounted.

With respect to this, as a result of intensive studies of the inventors, the inventors have newly found that it is possible to prevent a phenomenon in which a decrease in resistance value of the TMR head significantly occurs, in a case of using the TMR head as the servo head in the magnetic tape device, by using the magnetic tape in which the $FWHM_{before}$, the $FWHM_{after}$, and the difference ($S_{after}-S_{before}$) are respectively in the ranges described above. The surmise of the inventors regarding this point is as described in the following (1) and (2).

(1) A portion (projection) which mainly comes into contact (so-called real contact) with the servo head in a case where the magnetic tape and the servo head slide on each other, and a portion (hereinafter, referred to as a "base portion") having a height lower than that of the portion described above are normally present on the surface of the magnetic layer. The inventors have thought that the spacing described above is a value which is an index of a distance between the servo head and the base portion in a case where the magnetic tape and the servo head slide on each other. However, it is thought that, in a case where a lubricant included on the magnetic layer forms a liquid film on the surface of the magnetic layer, the liquid film is present between the base portion and the servo head, and thus, the spacing is narrowed by the thickness of the liquid film.

Meanwhile, the lubricant is generally divided broadly into a liquid lubricant and a boundary lubricant. Fatty acid ester included in the magnetic layer of the magnetic tape is known as a component which can function as a liquid lubricant. It is considered that a liquid lubricant can protect the surface of the magnetic layer by forming a liquid film on the surface of the magnetic layer. The inventors have thought that the presence of the liquid film of fatty acid ester on the surface of the magnetic layer contributes to the smooth sliding (improvement of sliding properties) between the magnetic tape and the servo head (TMR head). However, an excessive amount of fatty acid ester present on the surface of the magnetic layer causes sticking due to the formation of a meniscus (liquid crosslinking) between the surface of the magnetic layer and the servo head due to fatty acid ester, thereby decreasing sliding properties.

In regards to this point, the inventors focused on the idea that fatty acid ester is a component having properties of volatilizing by vacuum heating, and the difference ($S_{after}-S_{before}$) of a spacing between a state after the vacuum heating (state in which a liquid film of fatty acid ester is volatilized and removed) and a state before the vacuum heating (state in which the liquid film of fatty acid ester is present) was used as an index of a thickness of the liquid film formed of fatty acid ester on the surface of the magnetic layer. The inventors have surmised that the presence of the liquid film of fatty acid ester on the surface of the magnetic layer, so that the value of the difference is greater than 0 nm and equal to or smaller than 8.0 nm, causes the improvement of sliding properties between the servo head (TMR head) and the magnetic tape while preventing sticking.

(2) A smaller value of the full width at half maximum of spacing distribution means that a variation in the values of the spacing measured on each part of the surface of the magnetic layer is small. As a result of the intensive studies, the inventors found that it is effective to increase uniformity of a contact state between the surface of the magnetic layer and the servo head by increasing uniformity of a height of projection present on the surface of the magnetic layer and increasing uniformity of a thickness of a liquid film of fatty acid ester, in order to realize smooth sliding between the magnetic tape and the servo head.

In regards to this point, it is considered that the reason for the variation in values of the spacing is a variation in height of the projection of the surface of the magnetic layer and a variation in the thickness of the liquid film fatty acid ester. The inventors have surmised that the full width at half maximum of the spacing distribution $FWHM_{before}$, measured before the vacuum heating, that is, in a state where the liquid film of fatty acid ester is present on the surface of the magnetic layer, becomes great, as the variation in height of the projection and the variation in the thickness of the liquid film of fatty acid ester are great. Particularly, the spacing distribution $FWHM_{before}$ is greatly affected by the variation in the thickness of the liquid film of fatty acid ester. In contrast, the inventors have surmised that the full width at half maximum of the spacing distribution $FWHM_f$, measured after the vacuum heating, that is, in a state where the liquid film of fatty acid ester is removed from the surface of the magnetic layer, becomes great, as the variation in height of the projection is great. That is, the inventors have surmised that small full widths at half maximum of spacing distributions $FWHM_{before}$ and $FWHM_{after}$ mean a small variation in the thickness of the liquid film of fatty acid ester on the surface of the magnetic layer and a small variation in height of the projection. It is thought that an increase in uniformity of the height of the projection and the thickness of the liquid film of fatty acid ester so that the full widths at half maximum of the spacing distribution $FWHM_{before}$ and $FWHM_{after}$ are greater than 0 nm and equal to or smaller than 7.0 nm contributes to smooth sliding between the magnetic tape and the TMR head. As a result, the inventors have surmised that it is possible to prevent occurrence of short circuit due to damage on the TMR head due to the sliding on the magnetic tape having the magnetic layer surface roughness Ra of 2.0 nm and excellent smoothness of the surface of the magnetic layer.

However, the above descriptions are merely a surmise of the inventors and the invention is not limited thereto.

Hereinafter, the magnetic tape device will be described more specifically. A "decrease in resistance value of the TMR head" described below is a significant decrease in resistance value of the TMR head occurring in a case of reading a servo pattern by using the TMR head as the servo head, unless otherwise noted.

Magnetic Tape

Magnetic Layer Surface Roughness Ra

The center line average surface roughness Ra measured regarding the surface of the magnetic layer of the magnetic tape (magnetic layer surface roughness Ra) is equal to or smaller than 2.0 nm. This point can contribute to the reading of the servo pattern a high SNR in the magnetic tape device. From a viewpoint of further increasing the SNR, the magnetic layer surface roughness Ra is preferably equal to or smaller than 1.9 nm, more preferably equal to or smaller than 1.8 nm, even more preferably equal to or smaller than 1.7 nm, still preferably equal to or smaller than 1.6 nm, and still more preferably equal to or smaller than 1.5 nm. In addition, the magnetic layer surface roughness Ra can be, for example, equal to or greater than 1.0 nm or equal to or greater than 1.2 nm. However, from a viewpoint of increasing the SNR, a low magnetic layer surface roughness Ra is preferable, and thus, the magnetic layer surface roughness Ra may be lower than the lower limit exemplified above.

The center line average surface roughness Ra measured regarding the surface of the magnetic layer of the magnetic tape in the invention and the specification is a value measured with an atomic force microscope (AFM) in a region having an area of 40 μm×40 μm of the surface of the magnetic layer. As an example of the measurement conditions, the following measurement conditions can be used. The magnetic layer surface roughness Ra shown in examples which will be described later is a value obtained by the measurement under the following measurement conditions.

The measurement is performed regarding the region of 40 μm×40 μm of the area of the surface of the magnetic layer of the magnetic tape with an AFM (Nanoscope 4 manufactured by Veeco Instruments, Inc.) in a tapping mode. RTESP-300 manufactured by BRUKER is used as a probe, a scan speed (probe movement speed) is set as 40 μm/sec, and a resolution is set as 512 pixel×512 pixel.

The magnetic layer surface roughness Ra can be controlled by a well-known method. For example, the magnetic layer surface roughness Ra can be changed in accordance with the size of various powders included in the magnetic layer or manufacturing conditions of the magnetic tape. Thus, by adjusting one or more of these, it is possible to obtain the magnetic tape having the magnetic layer surface roughness Ra equal to or smaller than 2.0 nm.

Full Width at Half Maximum of Spacing Distribution $FWHM_{before}$ and $FWHM_{after}$ Both of the full width at half maximum of spacing distribution $FWHM_{before}$ before the vacuum heating and the full width at half maximum of spacing distribution $FWHM_{after}$ after the vacuum heating which are measured in the magnetic tape are greater than 0 nm and equal to or smaller than 7.0 nm. The inventors have surmised that this point contributes to the prevention of a decrease in resistance value of the TMR head. From a viewpoint of further preventing a decrease in resistance value of the TMR head, the $FWHM_{before}$ and the $FWHM_{after}$ are preferably equal to or smaller than 6.5 nm, more preferably equal to or smaller than 6.0 nm, even more preferably equal to or smaller than 5.5 nm, still more preferably equal to or smaller than 5.0 nm, and still even more preferably equal to or smaller than 4.5 nm. The $FWHM_{before}$ and the FWHM a, can be, for example, equal to or greater than 0.5 nm, equal to or greater than 1.0 nm, equal to or greater than 2.0 nm, or equal to or greater than 3.0 nm. Meanwhile, from a viewpoint of preventing a decrease in resistance value of the TMR head, it is preferable that the values thereof are small, and therefore, the values thereof may be smaller than the exemplified values.

The full width at half maximum of spacing distribution $FWHM_{before}$ before the vacuum heating can be decreased mainly by decreasing the variation in the thickness of the liquid film of fatty acid ester. An example of a specific method will be described later. Meanwhile, the full width at half maximum of spacing distribution $FWHM_{after}$ after the vacuum heating can be decreased by decreasing the variation in height of the projection of the surface of the magnetic layer. In order to realize the decrease described above, it is preferable that a presence state of the powder component included in the magnetic layer, for example, non-magnetic filler, which will be described later specifically, in the magnetic layer is controlled. An example of a specific method will be described later.

Difference ($S_{after}-S_{before}$)

The difference ($S_{after}-S_{before}$) of the spacings before and after the vacuum heating measured in the magnetic tape is greater than 0 nm and equal to or smaller than 8.0 nm. The inventors have surmised that this point also contributes to the prevention of a decrease in resistance value of the TMR head. From a viewpoint of further preventing a decrease in resistance value of the TMR head, the difference ($S_{after}-S_{before}$) is preferably equal to or greater than 0.1 nm, more preferably equal to or greater than 1.0 nm, even more preferably equal to or greater than 1.5 nm, still more preferably equal to or greater than 2.0 nm, and still even more preferably equal to or greater than 2.5 nm. Meanwhile, from a viewpoint of further preventing a decrease in resistance value of the TMR head, the difference ($S_{after}-S_{before}$) is preferably equal to or smaller than 7.5 nm, more preferably equal to or smaller than 7.0 nm, even more preferably equal to or smaller than 6.5 nm, still preferably equal to or smaller than 6.0 nm, still more preferably equal to or smaller than 5.5 nm, still even more preferably equal to or smaller than 5.0 nm, still furthermore preferably equal to or smaller than 4.5 nm, and still even furthermore preferably equal to or smaller than 4.0 nm. The difference ($S_{after}-S_{before}$) can be controlled by the amount of fatty acid ester added to a magnetic layer forming composition. In addition, regarding the magnetic tape including a non-magnetic layer between the non-magnetic support and the magnetic layer, the difference ($S_{after}-S_{before}$) can also be controlled by the amount of fatty acid ester added to a non-magnetic layer forming composition. This is because that the non-magnetic layer can play a role of holding a lubricant and supplying the lubricant to the magnetic layer, and fatty acid ester included in the non-magnetic layer may be moved to the magnetic layer and present in the surface of the magnetic layer.

ΔSFD

In the magnetic tape, the ΔSFD in a longitudinal direction of the magnetic tape calculated by Expression 1 is equal to or smaller than 0.50. It is thought that the ΔSFD is a value which may be an index showing a state of ferromagnetic powder present in the magnetic layer. Specifically, it is thought that, as a value of the ΔSFD is small, particles of the ferromagnetic powder are aligned by strong interaction. It is surmised that, a state where the ΔSFD is equal to or smaller than 0.50 is a state where particles of the ferromagnetic powder are suitably aligned and present in the magnetic layer, and such a state contributes to an increase in SNR at the time of reading a servo pattern written in the magnetic layer of the magnetic tape by the TMR head. From a viewpoint of further increasing the SNR, the ΔSFD is preferably equal to or smaller than 0.48, more preferably equal to or smaller than 0.45, even more preferably equal to or smaller than 0.40, still more preferably equal to or smaller than 0.35, and still even more preferably equal to or smaller than 0.30. In addition, from a viewpoint of furthermore increasing the SNR, the ΔSFD is preferably equal to or greater than 0.03, more preferably equal to or greater than 0.05, and even more preferably equal to or greater than 0.10.

The SFD in a longitudinal direction of the magnetic tape can be measured by using a well-known magnetic properties measurement device such as an oscillation sample type magnetic-flux meter. The same applies to the measurement of the SFD of the ferromagnetic powder. In addition, a measurement temperature of the SFD can be adjusted by setting the measurement device.

According to the studies of the inventors, the ΔSFD calculated by Expression 1 can be controlled by a preparation method of the magnetic tape, and mainly the following tendencies were seen: (A) the value decreases, as dispersibility of ferromagnetic powder in the magnetic layer increases; (B) the value decreases, as ferromagnetic powder having small temperature dependency of SFD is used; and (C) the value decreases, as the particles of the ferromagnetic powder are aligned in a longitudinal direction of the magnetic layer (as a degree of orientation in a longitudinal direction increases), and the value increases, as a degree of orientation in a longitudinal direction decreases.

For example, regarding (A), dispersion conditions are reinforced (an increase in dispersion time, a decrease in diameter and/or an increase in degree of filling of dispersion beads used in the dispersion, and the like), and a dispersing agent is used. As a dispersing agent, a well-known dispersing agent or a commercially available dispersing agent can be used.

Meanwhile, regarding (B), as an example, ferromagnetic powder in which a difference $\Delta SFD_{powder}$ between SFD of the ferromagnetic powder measured at a temperature of 100° C. and SFD thereof measured at a temperature of 25° C., which are calculated by Expression 2 is 0.05 to 1.50, can be used, for example. However, even in a case where the difference $\Delta SFD_{powder}$ is not in the range described above, it is possible to control the ΔSFD of the magnetic tape calculated by Expression 1 to be equal to or smaller than 0.50 by other controlling methods.

$$\Delta SFD_{powder} = SFD_{powder100°\ C.} - SFD_{powder25°\ C.} \quad \text{Expression 2}$$

(In Expression 2, the $SFD_{powder100°\ C.}$ is a switching field distribution SFD of ferromagnetic powder measured at a temperature of 100° C., and the $SFD_{powder25°\ C.}$ is a switching field distribution SFD of ferromagnetic powder measured at a temperature of 25° C.)

Regarding (C), the ΔSFD tends to decrease by performing the orientation process of the magnetic layer as longitudinal orientation. The ΔSFD tends to increase by performing the orientation process of the magnetic layer as homeotropic alignment or setting non-orientation without performing the orientation process.

Accordingly, for example, it is possible to obtain a magnetic tape in which the ΔSFD calculated by Expression 1 is equal to or smaller than 0.50, by respectively controlling one of the methods (A) to (C) or a combination of two or more arbitrary methods.

Next, the magnetic layer and the like included in the magnetic tape will be described more specifically.

Magnetic Layer
Ferromagnetic Powder

As the ferromagnetic powder included in the magnetic layer, ferromagnetic powder normally used in the magnetic layer of various magnetic recording media can be used. It is preferable to use ferromagnetic powder having a small average particle size, from a viewpoint of improvement of recording density of the magnetic tape. From this viewpoint, ferromagnetic powder having an average particle size equal to or smaller than 50 nm is preferably used as the ferromagnetic powder. Meanwhile, the average particle size of the ferromagnetic powder is preferably equal to or greater than 10 nm, from a viewpoint of stability of magnetization.

In one aspect, it is preferable to use ferromagnetic powder in which the difference $\Delta SFD_{powder}$ between the SFD measured at a temperature of 100° C. and the SFD measured at a temperature of 25° C., which are calculated by Expression 2 is in the range described above.

As a preferred specific example of the ferromagnetic powder, ferromagnetic hexagonal ferrite powder can be used. An average particle size of the ferromagnetic hexagonal ferrite powder is preferably 10 nm to 50 nm and more preferably 20 nm to 50 nm, from a viewpoint of improvement of recording density and stability of magnetization. For details of the ferromagnetic hexagonal ferrite powder, descriptions disclosed in paragraphs 0012 to 0030 of JP2011-225417A, paragraphs 0134 to 0136 of JP2011-216149A, and paragraphs 0013 to 0030 of JP2012-204726A can be referred to, for example.

As a preferred specific example of the ferromagnetic powder, ferromagnetic metal powder can also be used. An average particle size of the ferromagnetic metal powder is preferably 10 nm to 50 nm and more preferably 20 nm to 50 nm, from a viewpoint of improvement of recording density and stability of magnetization. For details of the ferromagnetic metal powder, descriptions disclosed in paragraphs 0137 to 0141 of JP2011-216149A and paragraphs 0009 to 0023 of JP2005-251351A can be referred to, for example.

In the invention and the specification, average particle sizes of various powder such as the ferromagnetic powder and the like are values measured by the following method with a transmission electron microscope, unless otherwise noted.

The powder is imaged at a magnification ratio of 100,000 with a transmission electron microscope, the image is printed on printing paper so that the total magnification of 500,000 to obtain an image of particles configuring the powder. A target particle is selected from the obtained image of particles, an outline of the particle is traced with a digitizer, and a size of the particle (primary particle) is measured. The primary particle is an independent particle which is not aggregated.

The measurement described above is performed regarding 500 particles arbitrarily extracted. An arithmetical mean of the particle size of 500 particles obtained as described above is an average particle size of the powder. As the transmission electron microscope, a transmission electron microscope H-9000 manufactured by Hitachi, Ltd. can be used, for example. In addition, the measurement of the particle size can be performed by well-known image analysis software, for example, image analysis software KS-400 manufactured by Carl Zeiss. The average particle size shown in examples which will be described later is a value measured by using transmission electron microscope H-9000 manufactured by Hitachi, Ltd. as the transmission electron microscope, and image analysis software KS-400 manufactured by Carl Zeiss as the image analysis software, unless otherwise noted. In the invention and the specification, the powder means an aggregate of a plurality of particles. For example, the ferromagnetic powder means an aggregate of a plurality of ferromagnetic particles. The aggregate of the plurality of particles not only includes an aspect in which particles configuring the aggregate directly come into contact with each other, and also includes an aspect in which a binding agent or an additive which will be described later is interposed between the particles. A term "particles" is also used for describing the powder.

As a method of collecting a sample powder from the magnetic tape in order to measure the particle size, a method disclosed in a paragraph of 0015 of JP2011-048878A can be used, for example.

In the invention and the specification, unless otherwise noted, (1) in a case where the shape of the particle observed in the particle image described above is a needle shape, a fusiform shape, or a columnar shape (here, a height is greater than a maximum long diameter of a bottom surface), the size (particle size) of the particles configuring the powder is shown as a length of a long axis configuring the particle, that is, a long axis length, (2) in a case where the shape of the particle is a planar shape or a columnar shape (here, a thickness or a height is smaller than a maximum long diameter of a plate surface or a bottom surface), the particle size is shown as a maximum long diameter of the plate surface or the bottom surface, and (3) in a case where the shape of the particle is a sphere shape, a polyhedron shape, or an unspecified shape, and the long axis configuring the particles cannot be specified from the shape, the particle size is shown as an equivalent circle diameter. The equivalent circle diameter is a value obtained by a circle projection method.

In addition, regarding an average acicular ratio of the powder, a length of a short axis, that is, a short axis length of the particles is measured in the measurement described above, a value of (long axis length/short axis length) of each particle is obtained, and an arithmetical mean of the values obtained regarding 500 particles is calculated. Here, unless otherwise noted, in a case of (1), the short axis length as the definition of the particle size is a length of a short axis configuring the particle, in a case of (2), the short axis length is a thickness or a height, and in a case of (3), the long axis and the short axis are not distinguished, thus, the value of (long axis length/short axis length) is assumed as 1, for convenience.

In addition, unless otherwise noted, in a case where the shape of the particle is specified, for example, in a case of definition of the particle size (1), the average particle size is an average long axis length, in a case of the definition (2), the average particle size is an average plate diameter, and an average plate ratio is an arithmetical mean of (maximum long diameter/thickness or height). In a case of the definition (3), the average particle size is an average diameter (also referred to as an average particle diameter).

The content (filling percentage) of the ferromagnetic powder of the magnetic layer is preferably 50 to 90 mass % and more preferably 60 to 90 mass %. The components other than the ferromagnetic powder of the magnetic layer are at least a binding agent and fatty acid ester, and one or more kinds of additives may be arbitrarily included. A high filling percentage of the ferromagnetic powder in the magnetic layer is preferable from a viewpoint of improvement recording density.

Binding Agent

The magnetic tape is a coating type magnetic tape, and the magnetic layer includes a binding agent together with the ferromagnetic powder. As the binding agent, one or more kinds of resin is used. The resin may be a homopolymer or a copolymer. As the binding agent, various resins normally used as a binding agent of the coating type magnetic recording medium can be used. For example, as the binding agent, a resin selected from a polyurethane resin, a polyester resin, a polyamide resin, a vinyl chloride resin, an acrylic resin obtained by copolymerizing styrene, acrylonitrile, or methyl methacrylate, a cellulose resin such as nitrocellulose, an epoxy resin, a phenoxy resin, and a polyvinylalkylal resin such as polyvinyl acetal or polyvinyl butyral can be used alone or a plurality of resins can be mixed with each other to be used. Among these, a polyurethane resin, an acrylic resin, a cellulose resin, and a vinyl chloride resin are preferable. These resins can be used as the binding agent even in the non-magnetic layer and/or a back coating layer which will be described later. For the binding agent described above, description disclosed in paragraphs 0028 to 0031 of JP2010-24113A can be referred to. In addition, the binding agent may be a radiation curable resin such as an electron beam-curable resin. For the radiation curable resin, descriptions disclosed in paragraphs 0044 and 0045 of JP2011-048878A can be referred to.

An average molecular weight of the resin used as the binding agent can be, for example, 10,000 to 200,000 as a weight-average molecular weight. The weight-average molecular weight of the invention and the specification is a value obtained by performing polystyrene conversion of a value measured by gel permeation chromatography (GPC). As the measurement conditions, the following conditions can be used. The weight-average molecular weight shown in examples which will be described later is a value obtained by performing polystyrene conversion of a value measured under the following measurement conditions.

GPC device: HLC-8120 (manufactured by Tosoh Corporation)

Column: TSK gel Multipore HXL-M (manufactured by Tosoh Corporation, 7.8 mmID (inner diameter)×30.0 cm)

Eluent: Tetrahydrofuran (THF)

In addition, a curing agent can also be used together with the binding agent. As the curing agent, in one aspect, a thermosetting compound which is a compound in which a curing reaction (crosslinking reaction) proceeds due to heating can be used, and in another aspect, a photocurable compound in which a curing reaction (crosslinking reaction) proceeds due to light irradiation can be used. At least a part of the curing agent is included in the magnetic layer in a state of being reacted (crosslinked) with other components such as the binding agent, by proceeding the curing reaction in the magnetic layer forming step. The preferred curing agent is a thermosetting compound, polyisocyanate is suitable. For details of the polyisocyanate, descriptions disclosed in paragraphs 0124 and 0125 of JP2011-216149A can be referred to, for example. The amount of the curing agent can be, for example, 0 to 80.0 parts by mass with respect to 100.0 parts by mass of the binding agent in the magnetic layer forming composition, and is preferably 50.0 to 80.0 parts by mass, from a viewpoint of improvement of strength of each layer such as the magnetic layer.

Fatty Acid Ester

The magnetic tape includes fatty acid ester in the magnetic layer. The fatty acid ester may be included alone as one type or two or more types thereof may be included. Examples of fatty acid ester include esters of lauric acid, myristic acid, palmitic acid, stearic acid, oleic acid, linoleic acid, linolenic acid, behenic acid, erucic acid, and elaidic acid. Specific examples thereof include butyl myristate, butyl palmitate, butyl stearate (butyl stearate), neopentyl glycol dioleate, sorbitan monostearate, sorbitan distearate, sorbitan tristearate, oleyl oleate, isocetyl stearate, isotridecyl stearate, octyl stearate, isooctyl stearate, amyl stearate, and butoxyethyl stearate.

The content of fatty acid ester, as the content of the magnetic layer forming composition, is, for example, 0.1 to 10.0 parts by mass and is preferably 1.0 to 7.0 parts by mass with respect to 100.0 parts by mass of ferromagnetic powder. In a case of using two or more kinds of different fatty acid esters as the fatty acid ester, the content thereof is the total content thereof. In the invention and the specification, the same applies to content of other components, unless otherwise noted. In addition, in the invention and the specification, a given component may be used alone or used in combination of two or more kinds thereof, unless otherwise noted.

In a case where the magnetic tape includes a non-magnetic layer between the non-magnetic support and the magnetic layer, the content of fatty acid ester in a non-magnetic layer forming composition is, for example, 0 to 10.0 parts by mass and is preferably 0.1 to 8.0 parts by mass with respect to 100.0 parts by mass of non-magnetic powder.

Other Lubricants

The magnetic tape includes fatty acid ester which is one kind of lubricants at least in the magnetic layer. The lubricants other than fatty acid ester may be arbitrarily included in the magnetic layer and/or the non-magnetic layer. As described above, the lubricant included in the non-magnetic layer may be moved to the magnetic layer and present in the surface of the magnetic layer. As the lubricant which may be arbitrarily included, fatty acid can be used. In addition, fatty acid amide and the like can also be used. Fatty acid ester is known as a component which can function as a liquid lubricant, whereas fatty acid and fatty acid amide are known as a component which can function as a boundary lubricant. It is considered that the boundary lubricant is a lubricant which can be adsorbed to a surface of powder (for example, ferromagnetic powder) and form a rigid lubricant film to decrease contact friction.

Examples of fatty acid include lauric acid, myristic acid, palmitic acid, stearic acid, oleic acid, linoleic acid, linolenic acid, behenic acid, erucic acid, and elaidic acid, and stearic acid, myristic acid, and palmitic acid are preferable, and stearic acid is more preferable. Fatty acid may be included in the magnetic layer in a state of salt such as metal salt.

As fatty acid amide, amide of various fatty acid described above is used, and examples thereof include lauric acid amide, myristic acid amide, palmitic acid amide, and stearic acid amide.

Regarding fatty acid and a derivative of fatty acid (amide and ester), a part derived from fatty acid of the fatty acid derivative preferably has a structure which is the same as or similar to that of fatty acid used in combination. As an example, in a case of using stearic acid as fatty acid, it is preferable to use stearic acid ester and/or stearic acid amide.

The content of fatty acid in the magnetic layer forming composition is, for example, 0 to 10.0 parts by mass, preferably 0.1 to 10.0 parts by mass, and more preferably 1.0 to 7.0 parts by mass, with respect to 100.0 parts by mass of the ferromagnetic powder. The content of fatty acid amide in the magnetic layer forming composition is, for example, 0 to 3.0 parts by mass, preferably 0 to 2.0 parts by mass, and more preferably 0 to 1.0 part by mass with respect to 100.0 parts by mass of the ferromagnetic powder.

In a case where the magnetic tape includes a non-magnetic layer between the non-magnetic support and the magnetic layer, the content of fatty acid in the non-magnetic layer forming composition is, for example, 0 to 10.0 parts by mass, preferably 1.0 to 10.0 parts by mass, and more preferably 1.0 to 7.0 parts by mass with respect to 100.0 parts by mass of the non-magnetic powder. The content of fatty acid amide in the non-magnetic layer forming composition is, for example, 0 to 3.0 parts by mass and preferably 0 to 1.0 part by mass with respect to 100.0 parts by mass of the non-magnetic powder.

Other Components

The magnetic layer may include one or more kinds of additives, if necessary, together with the various components described above. As the additives, a commercially available product can be suitably selected and used according to the desired properties. Alternatively, a compound synthesized by a well-known method can be used as the additives. As the additives, the curing agent described above is used as an example. In addition, examples of the additive which can be included in the magnetic layer include a non-magnetic filler, a dispersing agent, a dispersing assistant, an antibacterial agent, an antistatic agent, and an antioxidant. The non-magnetic filler is identical to the non-magnetic powder. As the non-magnetic filler, a non-magnetic filler (hereinafter, referred to as a "projection formation agent") which can function as a projection formation agent which forms projections suitably protruded from the surface of the magnetic layer, and a non-magnetic filler (hereinafter, referred to as an "abrasive") which can function as an abrasive can be used.

Non-Magnetic Filler

As the projection formation agent which is one aspect of the non-magnetic filler, various non-magnetic powders normally used as a projection formation agent can be used. These may be inorganic substances or organic substances. In one aspect, from a viewpoint of homogenization of friction properties, particle size distribution of the projection formation agent is not polydispersion having a plurality of peaks in the distribution and is preferably monodisperse showing a single peak. From a viewpoint of availability of monodisperse particles, the projection formation agent is preferably powder of inorganic substances (inorganic powder). Examples of the inorganic powder include powder of inorganic oxide such as metal oxide, metal carbonate, metal sulfate, metal nitride, metal carbide, and metal sulfide, and powder of inorganic oxide is preferable. The projection formation agent is more preferably colloidal particles and even more preferably inorganic oxide colloidal particles. In addition, from a viewpoint of availability of monodisperse particles, the inorganic oxide configuring the inorganic oxide colloidal particles are preferably silicon dioxide (silica). The inorganic oxide colloidal particles are more preferably colloidal silica (silica colloidal particles). In the invention and the specification, the "colloidal particles" are particles which are not precipitated and dispersed to generate a colloidal dispersion, in a case where 1 g of the particles is added to 100 mL of at least one organic solvent of at least methyl ethyl ketone, cyclohexanone, toluene, or ethyl acetate, or a mixed solvent including two or more kinds of the solvent described above at an arbitrary mixing ratio. The average particle size of the colloidal particles is a value obtained by a method disclosed in a paragraph 0015 of JP2011-048878A as a measurement method of an average particle diameter. In addition, in another aspect, the projection formation agent is preferably carbon black.

An average particle size of the projection formation agent is, for example, 30 to 300 nm and is preferably 40 to 200 nm.

The abrasive which is another aspect of the non-magnetic filler is preferably non-magnetic powder having Mohs hardness exceeding 8 and more preferably non-magnetic powder having Mohs hardness equal to or greater than 9. A maximum value of Mohs hardness is 10 of diamond. Specifically, powders of alumina ($Al_2O_3$), silicon carbide, boron carbide ($B_4C$), $SiO_2$, TiC, chromium oxide ($Cr_2O_3$), cerium oxide, zirconium oxide ($ZrO_2$), iron oxide, diamond, and the like can be used, and among these, alumina powder such as α-alumina and silicon carbide powder are preferable. In addition, regarding the particle size of the abrasive, a specific surface area which is an index for the particle size is, for example, equal to or greater than 14 $m^2/g$, and is preferably 16 $m^2/g$ and more preferably 18 $m^2/g$.

Further, the specific surface area of the abrasive can be, for example, equal to or smaller than 40 $m^2/g$. The specific surface area is a value obtained by a nitrogen adsorption method (also referred to as a Brunauer-Emmett-Teller (BET) 1 point method), and is a value measured regarding primary particles. Hereinafter, the specific surface area obtained by such a method is also referred to as a BET specific surface area.

In addition, from a viewpoint that the projection formation agent and the abrasive can exhibit the functions thereof in more excellent manner, the content of the projection formation agent of the magnetic layer is preferably 1.0 to 4.0 parts by mass and more preferably 1.5 to 3.5 parts by mass with respect to 100.0 parts by mass of the ferromagnetic powder. Meanwhile, the content of the magnetic layer is preferably 1.0 to 20.0 parts by mass, more preferably 3.0 to 15.0 parts by mass, and even more preferably 4.0 to 10.0 parts by mass with respect to 100.0 parts by mass of the ferromagnetic powder.

As an example of the additive which can be used in the magnetic layer including the abrasive, a dispersing agent disclosed in paragraphs 0012 to 0022 of JP2013-131285A can be used as a dispersing agent for improving dispersibility of the abrasive of the magnetic layer forming composition. It is preferable to improve dispersibility of the magnetic layer forming composition of the non-magnetic filler such as an abrasive, in order to decrease the magnetic layer surface roughness Ra.

Non-Magnetic Layer

Next, the non-magnetic layer will be described. The magnetic tape may include a magnetic layer directly on a non-magnetic support, or may include a non-magnetic layer including non-magnetic powder and a binding agent between the non-magnetic support and the magnetic layer. The non-magnetic powder used in the non-magnetic layer may be powder of inorganic substances or powder of organic substances. In addition, carbon black and the like can be used. Examples of the inorganic substances include metal, metal oxide, metal carbonate, metal sulfate, metal nitride, metal carbide, and metal sulfide. These non-magnetic powder can be purchased as a commercially available product or can be manufactured by a well-known method. For details thereof, descriptions disclosed in paragraphs 0146 to 0150 of JP2011-216149A can be referred to. For carbon black which can be used in the non-magnetic layer, descriptions disclosed in paragraphs 0040 and 0041 of JP2010-24113A can be referred to. The content (filling percentage) of the non-magnetic powder of the non-magnetic layer is preferably 50 to 90 mass % and more preferably 60 to 90 mass %.

In regards to other details of a binding agent or additives of the non-magnetic layer, the well-known technology regarding the non-magnetic layer can be applied. In addition, in regards to the type and the content of the binding agent, and the type and the content of the additive, for example, the well-known technology regarding the magnetic layer can be applied.

The non-magnetic layer of the magnetic tape also includes a substantially non-magnetic layer including a small amount of ferromagnetic powder as impurities or intentionally, together with the non-magnetic powder. Here, the substantially non-magnetic layer is a layer having a residual magnetic flux density equal to or smaller than 10 mT, a layer having coercivity equal to or smaller than 7.96 kA/m (100 Oe), or a layer having a residual magnetic flux density equal to or smaller than 10 mT and coercivity equal to or smaller than 7.96 kA/m (100 Oe). It is preferable that the non-magnetic layer does not have a residual magnetic flux density and coercivity.

Non-Magnetic Support

Next, the non-magnetic support will be described. As the non-magnetic support (hereinafter, also simply referred to as a "support"), well-known components such as polyethylene terephthalate, polyethylene naphthalate, polyamide, polyamide imide, aromatic polyamide subjected to biaxial stretching are used. Among these, polyethylene terephthalate, polyethylene naphthalate, and polyamide are preferable. Corona discharge, plasma treatment, easy-bonding treatment, or heating treatment may be performed with respect to these supports in advance.

Back Coating Layer

The magnetic tape can also include a back coating layer including non-magnetic powder and a binding agent on a surface side of the non-magnetic support opposite to the surface provided with the magnetic layer. The back coating layer preferably includes any one or both of carbon black and inorganic powder. In regards to the binding agent included in the back coating layer and various additives which can be arbitrarily included in the back coating layer, a well-known technology regarding the treatment of the magnetic layer and/or the non-magnetic layer can be applied.

Various Thickness

A thickness of the non-magnetic support is preferably 3.00 to 6.00 μm.

A thickness of the magnetic layer is preferably equal to or smaller than 0.15 μm and more preferably equal to or smaller than 0.10 μm, from a viewpoint of realization of high-density recording required in recent years. The thickness of the magnetic layer is even more preferably 0.01 to 0.10 μm. The magnetic layer may be at least single layer, the magnetic layer may be separated into two or more layers having different magnetic properties, and a configuration of a well-known multilayered magnetic layer can be applied. A thickness of the magnetic layer in a case where the magnetic layer is separated into two or more layers is a total thickness of the layers.

A thickness of the non-magnetic layer is, for example, 0.10 to 1.50 μm and is preferably 0.10 to 1.00 μm.

Meanwhile, the magnetic tape is normally used to be accommodated and circulated in a magnetic tape cartridge. In order to increase recording capacity for 1 reel of the magnetic tape cartridge, it is desired to increase a total length of the magnetic tape accommodated in 1 reel of the magnetic tape cartridge. In order to increase the recording capacity, it is necessary that the magnetic tape is thinned (hereinafter, referred to as "thinning"). As one method of thinning the magnetic tape, a method of decreasing a total thickness of a magnetic layer and a non-magnetic layer of a magnetic tape including the non-magnetic layer and the magnetic layer on a non-magnetic support in this order is used. In a case where the magnetic tape includes a non-magnetic layer, the total thickness of the magnetic layer and the non-magnetic layer is preferably equal to or smaller than 1.80 μm, more preferably equal to or smaller than 1.50 μm, and even more preferably equal to or smaller than 1.10 μm, from a viewpoint of thinning the magnetic tape. In addition, the total thickness of the magnetic layer and the non-magnetic layer can be, for example, equal to or greater than 0.10 μm.

A thickness of the back coating layer is preferably equal to or smaller than 0.90 μm and even more preferably 0.10 to 0.70 μm.

The thicknesses of various layers of the magnetic tape and the non-magnetic support can be acquired by a well-known film thickness measurement method. As an example, a cross section of the magnetic tape in a thickness direction is, for example, exposed by a well-known method of ion beams or microtome, and the exposed cross section is observed with a scanning electron microscope. In the cross section observation, various thicknesses can be acquired as a thickness acquired at one position of the cross section in the thickness direction, or an arithmetical mean of thicknesses acquired at a plurality of positions of two or more positions, for example, two positions which are arbitrarily extracted. In addition, the thickness of each layer may be acquired as a designed thickness calculated according to the manufacturing conditions.

Manufacturing Method

Preparation of Each Layer Forming Composition

Each composition for forming the magnetic layer, the non-magnetic layer, or the back coating layer normally includes a solvent, together with various components described above. As the solvent, various organic solvents generally used for manufacturing a coating type magnetic recording medium can be used. Among those, from a viewpoint of solubility of the binding agent normally used in the coating type magnetic recording medium, each layer forming composition preferably includes one or more ketone solvents such as acetone, methyl ethyl ketone, methyl isobutyl ketone, diisobutyl ketone, cyclohexanone, isophorone, and tetrahydrofuran. The amount of the solvent of each layer forming composition is not particularly limited, and can be set to be the same as that of each layer forming composition of a typical coating type magnetic recording medium. In addition, steps of preparing each layer forming composition generally include at least a kneading step, a dispersing step, and a mixing step provided before and after these steps, if necessary. Each step may be divided into two or more stages. All of raw materials used in the invention may be added at an initial stage or in a middle stage of each step. In addition, each raw material may be separately added in two or more steps. For example, a binding agent may be separately added in a kneading step, a dispersing step, and a mixing step for adjusting viscosity after the dispersion. In a manufacturing step of the magnetic tape, a well-known manufacturing technology of the related art can be used in a part of the step or in the entire step. In the kneading step, an open kneader, a continuous kneader, a pressure kneader, or a kneader having a strong kneading force such as an extruder is preferably used. The details of the kneading processes of these kneaders are disclosed in JP1989-106338A (JP-H01-106338A) and JP1989-79274A (JP-H01-79274A). In addition, in order to disperse each layer forming composition, glass beads and/or other beads can be used. As such dispersion beads, zirconia beads, titania beads, and steel beads which are dispersion beads having high specific gravity are preferable. These dispersion beads are preferably used by optimizing a bead diameter and a filling percentage. As a dispersing machine, a well-known dispersing machine can be used. Each layer forming composition may be filtered by a well-known method before performing the coating step. The filtering can be performed by using a filter, for example. As the filter used in the filtering, a filter having a hole diameter of 0.01 to 3 μm can be used, for example. In addition, as described above, as one method of obtaining a magnetic tape in which the ΔSFD calculated by Expression 1 is equal to or smaller than 0.50, it is preferable that the dispersion conditions are reinforced (an increase in dispersion time, a decrease in diameter and/or an increase in degree of filling of dispersion beads used in the dispersion, and the like), and a dispersing agent is used.

Coating Step

The magnetic layer can be formed, for example, by directly applying the magnetic layer forming composition onto the non-magnetic support or performing multilayer coating of the magnetic layer forming composition with the non-magnetic layer forming composition in order or at the same time. The back coating layer can be formed by applying the back coating layer forming composition to a side of the non-magnetic support opposite to a side provided with the magnetic layer (or to be provided with the magnetic layer). For details of the coating for forming each layer, a description disclosed in a paragraph 0066 of JP2010-231843A can be referred to.

Other Steps

For details of various other steps for manufacturing the magnetic tape, descriptions disclosed in paragraphs 0067 to 0070 of JP2010-231843A can be referred to.

One Aspect of Preferred Manufacturing Method

As a preferred manufacturing method of the magnetic tape, a manufacturing method of applying vibration to the magnetic layer can be used, in order to improve uniformity of the thickness of the liquid film of fatty acid ester on the surface of the magnetic layer. The inventors have surmised that, by adding vibration, the liquid film of fatty acid ester on the surface of the magnetic layer flows and the uniformity of the thickness of the liquid film is improved.

That is, the magnetic tape can be manufactured by a manufacturing method of forming the magnetic layer by applying the magnetic layer forming composition including ferromagnetic powder, a binding agent, and fatty acid ester on the non-magnetic support and drying to form a magnetic layer, and applying vibration to the formed magnetic layer. The manufacturing method is identical to the typical manufacturing method of the magnetic tape, except for applying vibration to the magnetic layer, and the details thereof are as described above.

Means for applying vibration are not particularly limited. For example, the vibration can be applied to the magnetic layer, by bringing the surface of the non-magnetic support, provided with the magnetic layer formed, on a side opposite to the magnetic layer to come into contact with a vibration imparting unit. The non-magnetic support, provided with the magnetic layer formed, may run while coming into contact with a vibration imparting unit. The vibration imparting unit, for example, includes an ultrasonic vibrator therein, and accordingly, vibration can be applied to a product coming into contact with the unit. It is possible to adjust the vibration applied to the magnetic layer by a vibration frequency, and strength of the ultrasonic vibrator, and/or the contact time with the vibration imparting unit. For example, the contact time can be adjusted by a running speed of the non-magnetic support, provided with the magnetic layer formed, while coming into contact with the vibration imparting unit. The vibration imparting conditions are not particularly limited, and may be set so as to control the full width at half maximum of the spacing distribution, particularly, the full width at half maximum of the spacing distribution $FWHM_{before}$ before vacuum heating. In order to set the vibration imparting conditions, a preliminary experiment can be performed before the actual manufacturing, and the conditions can be optimized.

In addition, the full width at half maximum of the spacing distribution $FWHM_{after}$ after the vacuum heating tends to be decreased, in a case where the dispersion conditions of the magnetic layer forming composition are reinforced (for example, the number of times of the dispersion is increased, the dispersion time is extended, and the like), and/or the filtering conditions are reinforced (for example, a filter having a small hole diameter is used as a filter used in the filtering, the number of times of the filtering is increased, and the like). The inventors have surmised that this is because the uniformity of the height of the projection present on the surface of the magnetic layer is improved, by improving dispersibility and/or the uniformity of the particle size of the particulate matter included in the magnetic layer forming composition, particularly, the non-magnetic filler which may function as the projection formation agent described above. A preliminary experiment can be performed before the actual manufacturing, and the dispersion conditions and/or the filtering conditions can be optimized.

In addition, in the magnetic tape including the magnetic layer including carbon black, it is effective to use the dispersing agent for improving dispersibility of the carbon black as a magnetic layer component, in order to decrease the full width at half maximum of the spacing distribution $FWHM_{after}$ after the vacuum heating. For example, organic tertiary amine can be used as a dispersing agent of carbon black. For details of the organic tertiary amine, descriptions disclosed in paragraphs 0011 to 0018 and 0021 of JP2013-049832A can be referred to. The organic tertiary amine is more preferably trialkylamine. An alkyl group included in trialkylamine is preferably an alkyl group having 1 to 18 carbon atoms. Three alkyl groups included in trialkylamine may be the same as each other or different from each other. For details of the alkyl group, descriptions disclosed in paragraphs 0015 and 0016 of JP2013-049832A can be referred to. As trialkylamine, trioctylamine is particularly preferable.

As described above, it is possible to obtain a magnetic tape included in the magnetic tape device according to one aspect of the invention. However, the manufacturing method described above is merely an example, the magnetic layer surface roughness Ra, the $FWHM_{before}$, the $FWHM_{after}$, the difference ($S_{after}-S_{before}$), and $\Delta SFD$ can be controlled to be in respective ranges described above by an arbitrary method capable of adjusting the magnetic layer surface roughness Ra, the $FWHM_{before}$, the $FWHM_{after}$, the difference ($S_{after}-S_{before}$), and $\Delta SFD$, and such an aspect is also included in the invention.

Formation of Servo Pattern

A servo pattern is formed in the magnetic layer by magnetizing a specific position of the magnetic layer with a servo pattern recording head (also referred to as a "servo write head"). A well-known technology regarding a servo pattern of the magnetic layer of the magnetic tape which is well known can be applied for the shapes of the servo pattern with which the head tracking servo can be performed and the disposition thereof in the magnetic layer. For example, as a head tracking servo system, a timing-based servo system and an amplitude-based servo system are known. The servo pattern of the magnetic layer of the magnetic tape may be a servo pattern capable of allowing head tracking servo of any system. In addition, a servo pattern capable of allowing head tracking servo in the timing-based servo system and a servo pattern capable of allowing head tracking servo in the amplitude-based servo system may be formed in the magnetic layer.

The magnetic tape described above is generally accommodated in a magnetic tape cartridge and the magnetic tape cartridge is mounted in the magnetic tape device. In the magnetic tape cartridge, the magnetic tape is generally accommodated in a cartridge main body in a state of being wound around a reel. The reel is rotatably provided in the cartridge main body. As the magnetic tape cartridge, a single reel type magnetic tape cartridge including one reel in a cartridge main body and a twin reel type magnetic tape cartridge including two reels in a cartridge main body are widely used. In a case where the single reel type magnetic tape cartridge is mounted in the magnetic tape device (drive) in order to record and/or reproduce information (magnetic signals) to the magnetic tape, the magnetic tape is drawn from the magnetic tape cartridge and wound around the reel on the drive side. A servo head is disposed on a magnetic tape transportation path from the magnetic tape cartridge to a winding reel. Sending and winding of the magnetic tape are performed between a reel (supply reel) on the magnetic tape cartridge side and a reel (winding reel) on the drive side. In the meantime, the servo head comes into contact with and slides on the surface of the magnetic layer of the magnetic tape, and accordingly, the reading of the servo pattern is performed by the servo head. With respect to this, in the twin reel type magnetic tape cartridge, both reels of the supply reel and the winding reel are provided in the magnetic tape cartridge. The magnetic tape according to one aspect of the invention may be accommodated in any of single reel type magnetic tape cartridge and twin reel type magnetic tape cartridge. The configuration of the magnetic tape cartridge is well known.

Servo Head

The magnetic tape device includes the TMR head as the servo head. The TMR head is a magnetic head including a tunnel magnetoresistance effect type element (TMR element). The TMR element can play a role of detecting a change in leakage magnetic field from the magnetic tape as a change in resistance value (electric resistance) by using a tunnel magnetoresistance effect, as a servo pattern reading element for reading a servo pattern formed in the magnetic layer of the magnetic tape. By converting the detected change in resistance value into a change in voltage, the servo pattern can be read (servo signal can be reproduced).

As the TMR head included in the magnetic tape device, a TMR head having a well-known configuration including a tunnel magnetoresistance effect type element (TMR element) can be used. For example, for details of the structure of the TMR head, materials of each unit configuring the TMR head, and the like, well-known technologies regarding the TMR head can be used.

The TMR head is a so-called thin film head. The TMR element included in the TMR head at least includes two electrode layers, a tunnel barrier layer, a free layer, and a fixed layer. The TMR head includes a TMR element in a state where cross sections of these layers face a side of a surface sliding on the magnetic tape. The tunnel barrier layer is positioned between the two electrode layers and the tunnel barrier layer is an insulating layer. Meanwhile, the free layer and the fixed layer are magnetic layers. The free layer is also referred to as a magnetization free layer and is a layer in which a magnetization direction changes depending on the external magnetic field. On the other hand, the fixed layer is a layer in which a magnetization direction does not change depending on the external magnetic field. The tunnel barrier layer (insulating layer) is positioned between the two electrodes, normally, and thus, even in a case where a voltage is applied, in general, a current does not flow or does not substantially flow. However, a current (tunnel current) flows by the tunnel effect depending on a magnetization direction of the free layer affected by a leakage magnetic field from the magnetic tape. The amount of a tunnel current flow changes depending on a relative angle of a magnetization direction of the fixed layer and a magnetization direction of the free layer, and as the relative angle decreases, the amount of the tunnel current flow increases. A change in amount of the tunnel current flow is detected as a change in resistance value by the tunnel magnetoresistance effect. By converting the change in resistance value into a change in voltage, the servo pattern can be read. For an example of the configuration of the TMR head, a description disclosed in FIG. 1 of JP2004-185676A can be referred to, for example. However, there is no limitation to the aspect shown in the drawing. FIG. 1 of JP2004-185676A shows two electrode layers and two shield layers. Here, a TMR head having a configuration in which the shield layer serves as an electrode layer is also well known and the TMR head having such a configuration can also be used. In the TMR head, a current (tunnel current) flows between the two electrodes and thereby changing electric resistance, by the tunnel magnetoresistance effect. The TMR head is a magnetic head having a CPP structure, and thus, a direction in which a current flows is a transportation direction of the magnetic tape. In the invention and the specification, the description regarding "orthogonal" includes a range of errors allowed in the technical field of the invention. For example, the range of errors means a range of less than ±10° from an exact orthogonal state, and the error from the exact orthogonal state is preferably within ±5° and more preferably within ±3°. A decrease in resistance value of the TMR head means a decrease in electric resistance measured by bringing an electric resistance measuring device into contact with a wiring connecting two electrodes, and a decrease in electric resistance between two electrodes in a state where a current does not flow. A significant decrease in resistance value (electric resistance) tends to become significant at the time of reading a servo pattern written in the magnetic layer of magnetic tape including the magnetic layer having the magnetic layer surface roughness Ra equal to or smaller than 2.0 nm. However, such a significant decrease in resistance value can be prevented by setting the $FWHM_{before}$, the $FWHM_{after}$, and the difference ($S_{after}-S_{before}$) to be in the range described above, in the magnetic tape in which the magnetic layer surface roughness Ra is equal to or smaller than 2.0 nm.

In one preferred aspect, in the magnetic tape device, it is possible to perform the head tracking servo by using the TMR head as the servo head in a case of recording information on the magnetic layer having a servo pattern at linear recording density equal to or greater than 250 kfci and/or reproducing information recorded. The unit, kfci, is a unit of linear recording density (not able to convert to the SI unit system). The linear recording density can be, for example, equal to or greater than 250 kfci and can also be equal to or greater than 300 kfci. The linear recording density can be, for example, equal to or smaller than 800 kfci and can also exceed 800 kfci. In the magnetic tape for high-density recording, a width of the servo band tends to decrease, in order to provide a large amount of data bands in the magnetic layer, and thus, the SNR at the time of reading a servo pattern easily decrease. However, a decrease in SNR can be prevented by setting the magnetic layer surface roughness Ra and the ΔSFD of the magnetic tape in the magnetic tape device to be in the ranges described above.

The servo head is a magnetic head including at least the TMR element as a servo pattern reading element. The servo head may include or may not include a reproducing element for reproducing information recorded on the magnetic tape. That is, the servo head and the reproducing head may be one magnetic head or separated magnetic heads. The same applies to a recording element for performing the recording of information in the magnetic tape.

As the magnetic tape is transported at a high speed in the magnetic tape device, it is possible to shorten the time for recording information and/or the time for reproducing information. Meanwhile, it is desired that the magnetic tape is transported at a low speed at the time of recording and reproducing information, in order to prevent a deterioration in recording and reproducing characteristics. From the viewpoint described above, in a case of reading a servo pattern by the servo head in order to perform head tracking servo at the time of recording and/or reproducing information, a magnetic tape transportation speed is preferably equal to or lower than 18 m/sec, more preferably equal to or lower than 15 m/sec, and even more preferably equal to or lower than 10 m/sec. The magnetic tape transportation speed can be, for example, equal to or higher than 1 m/sec. The magnetic tape transportation speed is also referred to as a running speed. In the invention and the specification, the "magnetic tape transportation speed" is a relative speed between the magnetic tape transported in the magnetic tape device and the servo head in a case where the servo pattern is read by the servo head. The magnetic tape transportation speed is normally set in a control unit of the magnetic tape device. As the magnetic tape transportation speed is low, the time for which the same portion of the TMR head comes into contact with the magnetic tape increases at the time of reading the servo pattern, and accordingly, damage on the TMR head more easily occurs and a decrease in resistance value easily occurs. In the magnetic tape device according to one aspect of the invention, such a decrease in resistance value can be prevented by using the magnetic tape described above.

Head Tracking Servo Method

One aspect of the invention relates to a head tracking servo method including: reading a servo pattern of a magnetic layer of a magnetic tape by a servo head in a magnetic tape device, in which the servo head is a magnetic head including a tunnel magnetoresistance effect type element as a servo pattern reading element, the magnetic tape includes a non-magnetic support, and a magnetic layer including ferromagnetic powder, a binding agent, and fatty acid ester on the non-magnetic support, the magnetic layer includes a servo pattern, a center line average surface roughness Ra measured regarding a surface of the magnetic layer is equal to or smaller than 2.0 nm, a full width at half maximum of spacing distribution measured by optical interferometry regarding the surface of the magnetic layer before performing a vacuum heating with respect to the magnetic tape is greater than 0 nm and equal to or smaller than 7.0 nm, a full width at half maximum of spacing distribution measured by optical interferometry regarding the surface of the magnetic layer after performing the vacuum heating with respect to the magnetic tape is greater than 0 nm and equal to or smaller than 7.0 nm, a difference ($S_{after}-S_{before}$) between a spacing $S_{after}$ measured by optical interferometry regarding the surface of the magnetic layer after performing the vacuum heating with respect to the magnetic tape and a spacing $S_{before}$ measured by optical interferometry regarding the surface of the magnetic layer before performing the vacuum heating with respect to the magnetic tape is greater than 0 nm and equal to or smaller than 8.0 nm, and ΔSFD in a longitudinal direction of the magnetic tape calculated by Expression 1 is equal to or smaller than 0.50. The reading of the servo pattern is performed by bringing the magnetic tape into contact with the servo head allowing sliding while transporting (causing running of) the magnetic tape. The details of the magnetic tape and the servo head used in the head tracking servo method are as the descriptions regarding the magnetic tape device according to one aspect of the invention.

Hereinafter, as one specific aspect of the head tracking servo, head tracking servo in the timing-based servo system will be described. However, the head tracking servo of the invention is not limited to the following specific aspect.

In the head tracking servo in the timing-based servo system (hereinafter, referred to as a "timing-based servo"), a plurality of servo patterns having two or more different shapes are formed in a magnetic layer, and a position of a servo head is recognized by an interval of time in a case where the servo head has read the two servo patterns having different shapes and an interval of time in a case where the servo head has read two servo patterns having the same shapes. The position of the magnetic head of the magnetic tape in the width direction is controlled based on the position of the servo head recognized as described above. In one aspect, the magnetic head, the position of which is controlled here, is a magnetic head (reproducing head) which reproduces information recorded on the magnetic tape, and in another aspect, the magnetic head is a magnetic head (recording head) which records information in the magnetic tape.

Figure 2:
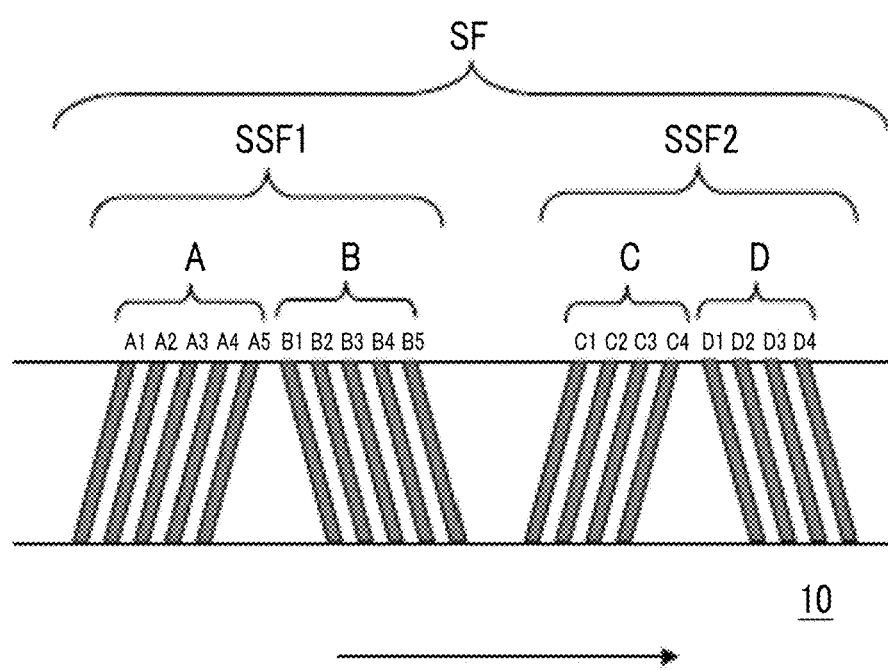
FIG. 2 shows a servo pattern disposition example of a linear-tape-open (LTO) Ultrium format tape.

FIG. 1 shows an example of disposition of data bands and servo bands. In FIG. 1, a plurality of servo bands 10 are disposed to be interposed between guide bands 12 in a magnetic layer of a magnetic tape 1. A plurality of regions 11 each of which is interposed between two servo bands are data bands. The servo pattern is a magnetized region and is formed by magnetizing a specific region of the magnetic layer by a servo write head. The region magnetized by the servo write head (position where a servo pattern is formed) is determined by standards. For example, in an LTO Ultrium format tape which is based on a local standard, a plurality of servo patterns tilted in a tape width direction as shown in FIG. 2 are formed on a servo band in a case of manufacturing a magnetic tape. Specifically, in FIG. 2, a servo frame SF on the servo band 10 is configured with a servo sub-frame 1 (SSF1) and a servo sub-frame 2 (SSF2). The servo sub-frame 1 is configured with an A burst (in FIG. 2, reference numeral A) and a B burst (in FIG. 2, reference numeral B). The A burst is configured with servo patterns A1 to A5 and the B burst is configured with servo patterns B1 to B5. Meanwhile, the servo sub-frame 2 is configured with a C burst (in FIG. 2, reference numeral C) and a D burst (in FIG. 2, reference numeral D). The C burst is configured with servo patterns C1 to C4 and the D burst is configured with servo patterns D1 to D4. Such 18 servo patterns are disposed in the sub-frames in the arrangement of 5, 5, 4, 4, as the sets of 5 servo patterns and 4 servo patterns, and are used for recognizing the servo frames. FIG. 2 shows one servo frame for explaining. However, in practice, in the magnetic layer of the magnetic tape in which the head tracking servo in the timing-based servo system is performed, a plurality of servo frames are disposed in each servo band in a running direction. In FIG. 2, an arrow shows the running direction. For example, an LTO Ultrium format tape generally includes 5,000 or more servo frames per a tape length of 1 m, in each servo band of the magnetic layer. The servo head sequentially reads the servo patterns in the plurality of servo frames, while coming into contact with and sliding on the surface of the magnetic layer of the magnetic tape transported in the magnetic tape device.

In the head tracking servo in the timing-based servo system, a position of a servo head is recognized based on an interval of time in a case where the servo head has read the two servo patterns (reproduced servo signals) having different shapes and an interval of time in a case where the servo head has read two servo patterns having the same shapes. The time interval is normally obtained as a time interval of a peak of a reproduced waveform of a servo signal. For example, in the aspect shown in FIG. 2, the servo pattern of the A burst and the servo pattern of the C burst are servo patterns having the same shapes, and the servo pattern of the B burst and the servo pattern of the D burst are servo patterns having the same shapes. The servo pattern of the A burst and the servo pattern of the C burst are servo patterns having the shapes different from the shapes of the servo pattern of the B burst and the servo pattern of the D burst. An interval of the time in a case where the two servo patterns having different shapes are read by the servo head is, for example, an interval between the time in a case where any servo pattern of the A burst is read and the time in a case where any servo pattern of the B burst is read. An interval of the time in a case where the two servo patterns having the same shapes are read by the servo head is, for example, an interval between the time in a case where any servo pattern of the A burst is read and the time in a case where any servo pattern of the C burst is read. The head tracking servo in the timing-based servo system is a system supposing that occurrence of a deviation of the time interval is due to a position change of the magnetic tape in the width direction, in a case where the time interval is deviated from the set value. The set value is a time interval in a case where the magnetic tape runs without occurring the position change in the width direction. In the timing-based servo system, the magnetic head is moved in the width direction in accordance with a degree of the deviation of the obtained time interval from the set value. Specifically, as the time interval is greatly deviated from the set value, the magnetic head is greatly moved in the width direction. This point is applied to not only the aspect shown in FIGS. 1 and 2, but also to entire timing-based servo systems.

For the details of the head tracking servo in the timing-based servo system, well-known technologies such as technologies disclosed in U.S. Pat. No. 5,689,384A, U.S. Pat. No. 6,542,325B, and U.S. Pat. No. 7,876,521B can be referred to, for example. In addition, for the details of the head tracking servo in the amplitude-based servo system, well-known technologies disclosed in U.S. Pat. No. 5,426,543A and U.S. Pat. No. 5,898,533A can be referred to, for example.

According to one aspect of the invention, a magnetic tape used in a magnetic tape device in which a TMR head is used as a servo head, the magnetic tape including: a magnetic layer including ferromagnetic powder, a binding agent, and fatty acid ester on a non-magnetic support, in which the magnetic layer includes a servo pattern, a center line average surface roughness Ra measured regarding a surface of the magnetic layer is equal to or smaller than 2.0 nm, a full width at half maximum of spacing distribution measured by optical interferometry regarding the surface of the magnetic layer before performing a vacuum heating with respect to the magnetic tape is greater than 0 nm and equal to or smaller than 7.0 nm, a full width at half maximum of spacing distribution measured by optical interferometry regarding the surface of the magnetic layer after performing the vacuum heating with respect to the magnetic tape is greater than 0 nm and equal to or smaller than 7.0 nm, and a difference ($S_{after}-S_{before}$) between a spacing S, measured by optical interferometry regarding the surface of the magnetic layer after performing the vacuum heating with respect to the magnetic tape and a spacing $S_{before}$ measured by optical interferometry regarding the surface of the magnetic layer before performing the vacuum heating with respect to the magnetic tape is greater than 0 nm and equal to or smaller than 8.0 nm, and ΔSFD in a longitudinal direction of the magnetic tape calculated by Expression 1 is equal to or smaller than 0.50, is also provided. The details of the magnetic tape are also as the descriptions regarding the magnetic tape device according to one aspect of the invention.

EXAMPLES

Hereinafter, the invention will be described with reference to examples. However, the invention is not limited to aspects shown in the examples. "Parts" and "%" in the following description mean "parts by mass" and "mass %", unless otherwise noted. In addition, steps and evaluations described below are performed in an environment of an atmosphere temperature of 23° C.±1° C., unless otherwise noted.

Example 1

1. Manufacturing of Magnetic Tape
(1) Preparation of Alumina Dispersion
3.0 parts of 2,3-dihydroxynaphthalene (manufactured by Tokyo Chemical Industry Co., Ltd.), 31.3 parts of a 32% solution (solvent is a mixed solvent of methyl ethyl ketone and toluene) of a polyester polyurethane resin having a $SO_3Na$ group as a polar group (UR-4800 (amount of a polar group: 80 meq/kg) manufactured by Toyobo Co., Ltd.), and 570.0 parts of a mixed solution of methyl ethyl ketone and cyclohexanone (mass ratio of 1:1) as a solvent were mixed in 100.0 parts of alumina powder (HIT-80 manufactured by Sumitomo Chemical Co., Ltd.) having an gelatinization ratio of 65% and a BET specific surface area of 30 $m^2/g$, and dispersed in the presence of zirconia beads by a paint shaker for 5 hours. After the dispersion, the dispersion liquid and the beads were separated by a mesh and an alumina dispersion was obtained.
(2) Magnetic Layer Forming Composition List
Magnetic Solution
Ferromagnetic powder (Ferromagnetic hexagonal ferrite powder (barium ferrite)): 100.0 parts
  Average particle size, coercivity He, and $ΔSFD_{powder}$ calculated by Expression 2: see Table 1
$SO_3Na$ group-containing polyurethane resin: 14.0 parts
  Weight-average molecular weight: 70,000, $SO_3Na$ group: 0.2 meq/g
Cyclohexanone: 150.0 parts
Methyl ethyl ketone: 150.0 parts
Abrasive Liquid
Alumina dispersion prepared in the section (1): 6.0 parts
Silica Sol (Projection forming agent liquid)
Colloidal silica: 2.0 parts
  Average particle size: see Table 1
Methyl ethyl ketone: 1.4 parts Other Components
Butyl stearate: see Table 1
Stearic acid: 1.0 part
Polyisocyanate (CORONATE (registered trademark) manufactured by Nippon Polyurethane Industry Co., Ltd.): 2.5 parts
Finishing Additive Solvent
Cyclohexanone: 200.0 parts
Methyl ethyl ketone: 200.0 parts
(3) Non-Magnetic Layer Forming Composition List
Non-magnetic inorganic powder: α-iron oxide: 100.0 parts
  Average particle size (average long axis length): 0.15 μm
  Average acicular ratio: 7
  BET specific surface area: 52 $m^2/g$
Carbon black: 20.0 parts
  Average particle size: 20 nm
An electron beam-curable vinyl chloride copolymer: 13.0 parts
An electron beam-curable polyurethane resin: 6.0 parts
Butyl stearate: see Table 1
Stearic acid: 1.0 part
Cyclohexanone: 300.0 parts
Methyl ethyl ketone: 300.0 parts
(4) List of Components of Back Coating Layer Forming Composition
Non-magnetic inorganic powder: α-iron oxide: 80.0 parts
  Average particle size (average long axis length): 0.15 μm
  Average acicular ratio: 7
  BET specific surface area: 52 $m^2/g$
Carbon black: 20.0 parts
  Average particle size: 20 nm
A vinyl chloride copolymer: 13.0 parts
A sulfonic acid group-containing polyurethane resin: 6.0 parts
Phenylphosphonic acid: 3.0 parts
Stearic acid: 3.0 parts
Butyl stearate: 3.0 parts
Polyisocyanate (CORONATE (registered trademark) L manufactured by Nippon Polyurethane Industry Co., Ltd.): 5.0 parts
Methyl ethyl ketone: 155.0 parts
Cyclohexanone: 355.0 parts
(5) Preparation of Each Layer Forming Composition
(i) Preparation of Magnetic Layer Forming Composition
The magnetic layer forming composition was prepared by the following method.
A magnetic solution was prepared by performing beads-dispersing of the magnetic solution components described above by using beads as the dispersion medium in a batch type vertical sand mill. The dispersion time of the beads dispersion was set as the dispersion time shown in Table 1 and zirconia beads having a bead diameter of 0.5 mm were used as the dispersion beads.
The prepared magnetic solution, the abrasive liquid and other components (the silica sol, the other components, and the finishing additive solvents) were introduced into a dissolver stirrer, and were stirred at a circumferential speed of 10 m/sec for 30 minutes. After that, the treatment was performed with a flow type ultrasonic dispersing device at a flow rate of 7.5 kg/min for the number of times of the passes shown in Table 1, and then, a magnetic layer forming composition was prepared by performing filtering with a filter having a hole diameter shown in Table 1, for the number of times of the passes shown in Table 1. A part of the prepared magnetic layer forming composition was collected and a dispersion particle diameter which is an index for dispersibility of ferromagnetic powder (ferromagnetic hexagonal barium ferrite powder) was measured by a method which will be described later. The measured value is shown in Table 1.

(ii) Preparation of Non-Magnetic Layer Forming Composition

The non-magnetic layer forming composition was prepared by the following method.

Each component excluding stearic acid, butyl stearate, cyclohexanone, and methyl ethyl ketone was beads-dispersed by using batch type vertical sand mill for 24 hours to obtain a dispersion liquid. As the dispersion beads, zirconia beads having a bead diameter of 0.1 mm were used. After that, the remaining components were added into the obtained dispersion liquid and stirred with a dissolver. The dispersion liquid obtained as described above was filtered with a filter having a hole diameter of 0.5 µm and a non-magnetic layer forming composition was prepared.

(iii) Preparation of Back Coating Layer Forming Composition

The back coating layer forming composition was prepared by the following method.

Each component excluding stearic acid, butyl stearate, polyisocyanate, and cyclohexanone was kneaded and diluted by an open kneader. Then, the obtained mixed solution was subjected to a dispersion process of 12 passes, with a transverse beads mill dispersing device and zirconia beads having a bead diameter of 1 mm, by setting a bead filling percentage as 80 volume %, a circumferential speed of rotor distal end as 10 m/sec, and a retention time for 1 pass as 2 minutes. After that, the remaining components were added into the obtained dispersion liquid and stirred with a dissolver. The dispersion liquid obtained as described above was filtered with a filter having a hole diameter of 1.0 µm and a back coating layer forming composition was prepared.

(6) Manufacturing Method of Magnetic Tape

The non-magnetic layer forming composition was applied onto a polyethylene naphthalate support having a thickness of 5.00 µm and dried so that the thickness after the drying becomes 1.00 µm, and then, an electron beam was emitted with an energy of 40 kGy at an acceleration voltage of 125 kV. The magnetic layer forming composition was applied so that the thickness after the drying becomes 70 nm (0.07 µm) to form a coating layer of the magnetic layer forming composition. The formed coating layer was dried without performing the orientation process (non-orientation).

Figure 3:
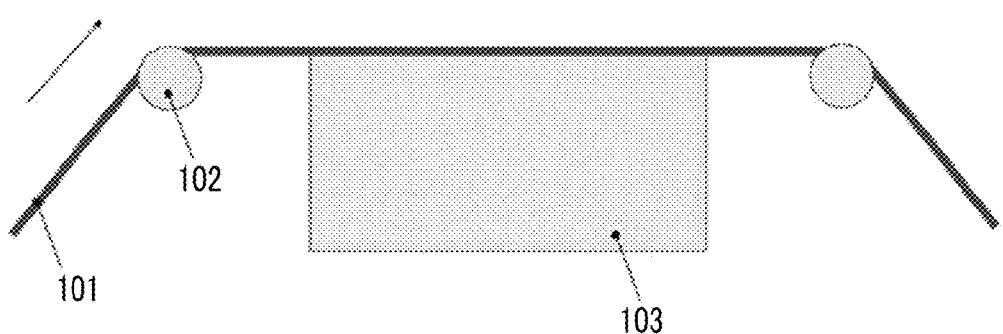
FIG. 3 is a schematic configuration diagram of a vibration imparting device used in examples.

After that, the support, provided with the coating layer formed, was installed in a vibration imparting device shown in FIG. 3 so that the surface thereof on a side opposite to the surface where the coating layer is formed comes into contact with the vibration imparting unit, and the support (in FIG. 3, reference numeral 101), provided with the coating layer formed, was transported at a transportation speed of 0.5 m/sec, to apply vibration to the coating layer. In FIG. 3, a reference numeral 102 denotes a guide roller (a reference numeral 102 denotes one of two guide rollers), a reference numeral 103 denotes the vibration imparting device (vibration imparting unit including the ultrasonic vibrator), and an arrow denotes a transportation direction. The time from the start of the contact of the arbitrary portion of the support, provided with the coating layer formed, with the vibration imparting unit until the end of the contact (vibration imparting time) is shown in Table 1 as the imparting time. The vibration imparting unit used includes an ultrasonic vibrator therein. The vibration was imparted by setting a vibration frequency and the intensity of the ultrasonic vibrator as values shown in Table 1.

After that, the back coating layer forming composition was applied onto the surface of the support on a side opposite to the surface where the non-magnetic layer and the magnetic layer are formed, and dried so that the thickness after the drying becomes thickness of 0.40 µm.

After that, the surface smoothing treatment (calender process) was performed with a a calender roll configured of only a metal roll, at a calender process speed of 80 m/min, linear pressure of 300 kg/cm (294 kN/m), and a calender temperature (surface temperature of a calender roll) shown in Table 1. As the calender process conditions are reinforced (for example, as the surface temperature of the calender roll increases), the center line average surface roughness Ra measured regarding the surface of the magnetic layer tends to decrease. Then, the thermal treatment was performed in the environment of the atmosphere temperature of 70° C. for 36 hours. After the thermal treatment, the slitting was performed so as to have a width of ½ inches (0.0127 meters), and the surface of the magnetic layer was cleaned with a tape cleaning device in which a nonwoven fabric and a razor blade are attached to a device including a sending and winding device of the slit so as to press the surface of the magnetic layer.

By doing so, a magnetic tape for forming a servo pattern in the magnetic layer was manufactured.

In a state where the magnetic layer of the manufactured magnetic tape was demagnetized, servo patterns having disposition and shapes according to the LTO Ultrium format were formed on the magnetic layer by using a servo write head mounted on a servo tester. Accordingly, a magnetic tape including data bands, servo bands, and guide bands in the disposition according to the LTO Ultrium format in the magnetic layer, and including servo patterns having the disposition and the shape according to the LTO Ultrium format on the servo band is manufactured. The servo tester includes a servo write head and a servo head. This servo tester was also used in evaluations which will be described later.

The thickness of each layer and the thickness of the non-magnetic support of the manufactured magnetic tape were acquired by the following method, and it was confirmed that the thicknesses obtained are the thicknesses described above.

A cross section of the magnetic tape in a thickness direction was exposed to ion beams and the exposed cross section was observed with a scanning electron microscope. Various thicknesses were obtained as an arithmetical mean of thicknesses obtained at two portions in the thickness direction in the cross section observation.

A part of the magnetic tape manufactured by the method described above was used in the evaluation of physical properties described below, and the other part was used in order to measure an SNR and a resistance value of the TMR head which will be described later.

2. Evaluation of Ferromagnetic Powder and Magnetic Layer Forming Composition (1) Dispersion Particle Diameter of Magnetic Layer Forming Composition A part of the magnetic layer forming composition prepared as described above was collected, and a sample solution diluted by an organic solvent used in the preparation of the composition to 1/50 based on mass was prepared. Regarding the prepared sample solution, an arithmetic average particle diameter measured by using a light scattering particle size analyzer (LB500 manufactured by Horiba, Ltd.) was used as the dispersion particle diameter.

(2) Average Particle Size of Ferromagnetic Powder

An average particle size of the ferromagnetic powder was obtained by the method described above.

(3) $\Delta SFD_{powder}$ and Coercivity Hc of Ferromagnetic Powder

Regarding the ferromagnetic powder, the SFDs were measured at a temperature of 100° C. and a temperature of 25° C. with an applied magnetic field of 796 kA/m (10 kOe) by using an oscillation sample type magnetic-flux meter (manufactured by Toei Industry Co., Ltd.). From measurement results of the SFDs, the $\Delta SFD_{powder}$ was calculated by Expression 2.

The coercivity Hc of the ferromagnetic powder was measured at a temperature of 25° C. with an applied magnetic field of 796 kA/m (10 kOe) by using an oscillation sample type magnetic-flux meter (manufactured by Toei Industry Co., Ltd.).

The evaluation was performed in Examples and Comparative Examples which will be described later in the same manner as described above.

3. Evaluation of Physical Properties of Magnetic Tape (1) Center Line Average Surface Roughness Ra Measured Regarding Surface of Magnetic Layer The measurement regarding a measurement area of 40 µm×40 µm in the surface of the magnetic layer of the magnetic tape was performed with an atomic force microscope (AFM, Nanoscope 4 manufactured by Veeco Instruments, Inc.) in a tapping mode, and a center line average surface roughness Ra was acquired. RTESP-300 manufactured by BRUKER is used as a probe, a scan speed (probe movement speed) was set as 40 µm/sec, and a resolution was set as 512 pixel×512 pixel.

(2) Full Width at Half Maximum of Spacing Distributions $FWHM_{before}$ and $FWHM_{after}$ Before and after Vacuum Heating The full width at half maximum of the spacing distributions $FWHM_{before}$ and $FWHM_{after}$ before and after vacuum heating were acquired by the following method by using a tape spacing analyzer (TSA) (manufactured by Micro Physics, Inc.).

In a state where a glass sheet included in the TSA was disposed on the surface of the magnetic layer of the magnetic tape, a hemisphere was pressed against the surface of the back coating layer of the magnetic tape at a pressure of $5.05 \times 10^4$ N/m (0.5 atm) by using a hemisphere made of urethane included in the TSA as a pressing member. In this state, a given region (150,000 to 200,000 µm²) of the surface of the magnetic layer of the magnetic tape was irradiated with white light from a stroboscope included in the TSA through the glass sheet, and the obtained reflected light was received by a charge-coupled device (CCD) through an interference filter (filter selectively passing light at a wavelength of 633 nm), and thus, an interference fringe image generated on the uneven part of the region was obtained.

This image was divided into 300,000 points, a distance (spacing) between the surface of the glass sheet on the magnetic tape side and the surface of the magnetic layer of the magnetic tape was acquired, and the full width at half maximum of spacing distribution was full width at half maximum, in a case where this spacing was shown with a histogram, and this histogram was fit with Gaussian distribution.

The vacuum heating was performed by storing the magnetic tape in a vacuum constant temperature drying machine with a degree of vacuum of 200 Pa to 0.01 Mpa and at inner atmosphere temperature of 70° C. to 90° C. for 24 hours.

(3) Difference ($S_{after} - S_{before}$)

The difference ($S_{after} - S_{before}$) was a value obtained by subtracting a mode of the histogram before the vacuum heating from a mode of the histogram after the vacuum heating obtained in the section (2).

(4) $\Delta SFD$

The SFDs were measured in a longitudinal direction of the magnetic tape at a temperature of 25° C. and a temperature of −190° C. with an applied magnetic field of 796 kA/m (10 kOe) by using an oscillation sample type magnetic-flux meter (manufactured by Toei Industry Co., Ltd.). From measurement results, the $\Delta SFD$ in a longitudinal direction of the magnetic tape was calculated by Expression 1.

4. Measurement of SNR

In an environment of an atmosphere temperature of 23° C.±1° C. and relative humidity of 50%, the servo head of the servo tester was replaced with a commercially available TMR head (element width of 70 nm) as a reproducing head for HDD. The reading of a servo pattern was performed by attaching the magnetic tape manufactured in the section 1. to the servo tester, and the SNR was obtained as a ratio of the output and noise. The SNR was calculated as a relative value by setting the SNR measured as 0 dB in Comparative Example 1 which will be described later. In a case where the SNR calculated as described above is equal to or greater than 7.0 dB, it is possible to evaluate that performance of dealing with future needs accompanied with high-density recording is obtained.

5. Measurement of Resistance Value of Servo Head

In an environment of an atmosphere temperature of 23° C.±1° C. and relative humidity of 50%, the servo head of the servo tester was replaced with a commercially available TMR head (element width of 70 nm) as a reproducing head for HDD. In the servo tester, the magnetic tape manufactured in the part 1. was transported while bringing the surface of the magnetic layer into contact with the servo head and causing sliding therebetween. A tape length of the magnetic tape was 1,000 m, and a total of 4,000 passes of the transportation (running) of the magnetic tape was performed by setting the magnetic tape transportation speed (relative speed of the magnetic tape and the servo head) at the time of the transportation as 4 m/sec. The servo head was moved in a width direction of the magnetic tape by 2.5 µm for 1 pass, a resistance value (electric resistance) of the servo head for transportation of 400 passes was measured, and a rate of a decrease in resistance value with respect to an initial value (resistance value at 0 pass) was obtained by the following equation.

Rate of decrease in resistance value (%)=[(initial value−resistance value after transportation of 400 passes)/initial value]×100

The measurement of the resistance value (electric resistance) was performed by bringing an electric resistance measuring device (digital multi-meter (product number: DA-50C) manufactured by Sanwa Electric Instrument Co., Ltd.) into contact with a wiring connecting two electrodes of a TMR element included in a TMR head. In a case where the calculated rate of a decrease in resistance value was equal to or greater than 30%, it was determined that a decrease in resistance value occurred. Then, a servo head was replaced with a new head, and transportation after 400 passes was performed and a resistance value was measured. The number of times of occurrence of a decrease in resistance value which is 1 or greater indicates a significant decrease in resistance value. In the running of 4,000 passes, in a case where the rate of a decrease in resistance value did not become equal to or greater than 30%, the number of times of occurrence of a decrease in resistance value was set as 0. In a case where the number of times of occurrence of a decrease in resistance value is 0, the maximum value of the measured rate of a decrease in resistance value is shown in Table 1.

Examples 2 to 8 and Comparative Examples 1 to 13

1. Manufacturing of Magnetic Tape

A magnetic tape was manufactured in the same manner as in Example 1, except that various conditions shown in Table 1 were changed as shown in Table 1.

In Table 1, in the comparative examples in which "none" is shown in a column of the orientation, the magnetic layer was formed without performing the orientation process in the same manner as in Example 1.

In the examples in which "longitudinal" is disclosed in a column of the orientation, a longitudinal orientation process was performed by applying a magnetic field having a magnetic field strength of 0.3 T to the surface of the coating layer in a longitudinal direction, while the coating layer of the magnetic layer forming composition is wet. After that, the coating layer was dried.

In Table 1, in the comparative examples in which "none" is disclosed in a column of the ultrasonic vibration imparting conditions, a magnetic tape was manufactured by a manufacturing step in which the vibration imparting is not performed.

2. Evaluation of Physical Properties of Magnetic Tape

Various physical properties of the manufactured magnetic tape were evaluated in the same manner as in Example 1.

3. Measurement of SNR

The SNR was measured by the same method as that in Example 1, by using the manufactured magnetic tape. In Examples 2 to 8 and Comparative Examples 5 to 13, the TMR head which was the same as that in Example 1 was used as a servo head. In Comparative Examples 1 to 4, a commercially available spin valve type GMR head (element width of 70 nm) was used as a servo head.

4. Measurement of Resistance Value of Servo Head

A resistance value of the servo head was measured by the same method as that in Example 1, by using the manufactured magnetic tape. As the servo head, the same servo head (TMR head or GMR head) as the servo head used in the measurement of the SNR was used. In Comparative Example 10, it was difficult to continue the sliding between the magnetic tape and the servo head due to the sticking of the magnetic tape and the servo head. In Comparative Example 11, it was difficult to allow the sliding between the magnetic tape and the servo head due to an effect of scraps generated due to chipping of the surface of the magnetic layer caused by the sliding between the magnetic tape and the servo head. Thus, in Comparative Examples 10 and 11, the measurement of a resistance value of the servo head was not performed.

In Comparative Examples 1 to 4, the GMR head used as the servo head was a magnetic head having a CIP structure including two electrodes with an MR element interposed therebetween in a direction orthogonal to the transportation direction of the magnetic tape. A resistance value was measured in the same manner as in Example 1, by bringing an electric resistance measuring device into contact with a wiring connecting these two electrodes.

The results of the evaluations described above are shown in Table 1.

TABLE 1-1

| | Ferromagnetic hexagonal ferrite powder | | | | Dispersion | | | Colloidal | |
| --- | --- | --- | --- | --- | --- | --- | --- | --- | --- |
| | $\Delta SFD_{powder}$ | Hc (Oe) | (kA/m) | Average particle size (nm) | Beads dispersion time (hour) | Dispersion particle diamter (nm) | Orientation | silica average particle size (nm) | Calender temperature |
| Comparative Example 1 | 0.30 | 1978 | 157 | 25 | 48 | 20 | None | 120 nm | 80° C. |
| Comparative Example 2 | 0.30 | 1978 | 157 | 25 | 48 | 20 | None | 120 nm | 90° C. |
| Comparative Example 3 | 0.30 | 1978 | 157 | 25 | 48 | 20 | None | 80 nm | 90° C. |
| Comparative Example 4 | 0.30 | 1978 | 157 | 25 | 48 | 20 | None | 40 nm | 110° C. |
| Comparative Example 5 | 0.30 | 1978 | 157 | 25 | 48 | 20 | None | 120 nm | 80° C. |
| Comparative Example 6 | 0.30 | 1978 | 157 | 25 | 48 | 20 | None | 120 nm | 90° C. |
| Comparative Example 7 | 0.30 | 1978 | 157 | 25 | 48 | 20 | None | 80 nm | 90° C. |
| Comparative Example 8 | 0.30 | 1978 | 157 | 25 | 48 | 20 | None | 40 nm | 110° C. |
| Comparative Example 9 | 0.20 | 2011 | 160 | 25 | 48 | 20 | None | 80 nm | 90° C. |
| Comparative Example 10 | 0.20 | 2011 | 160 | 25 | 48 | 20 | None | 80 nm | 90° C. |
| Comparative Example 11 | 0.20 | 2011 | 160 | 25 | 48 | 20 | None | 80 nm | 90° C. |
| Comparative Example 12 | 0.20 | 2011 | 160 | 25 | 48 | 20 | None | 80 nm | 90° C. |
| Comparative Example 13 | 0.30 | 1978 | 157 | 25 | 48 | 20 | None | 80 nm | 90° C. |
| Example 1 | 0.20 | 2011 | 160 | 25 | 48 | 20 | None | 80 nm | 90° C. |
| Example 2 | 0.80 | 1850 | 147 | 24 | 48 | 20 | Longitudinal | 80 nm | 90° C. |
| Example 3 | 0.30 | 1978 | 157 | 25 | 48 | 20 | Longitudinal | 80 nm | 90° C. |

TABLE 1-1-continued

| | | | | | | | | | |
|---|---|---|---|---|---|---|---|---|---|
| Example 4 | 0.10 | 1840 | 146 | 23 | 35 | 50 | Longitudinal | 80 nm | 90° C. |
| Example 5 | 0.10 | 1840 | 146 | 23 | 48 | 20 | Longitudinal | 80 nm | 90° C. |
| Example 6 | 0.30 | 1978 | 157 | 25 | 48 | 20 | Longitudinal | 80 nm | 90° C. |
| Example 7 | 0.30 | 1978 | 157 | 25 | 48 | 20 | Longitudinal | 80 nm | 90° C. |
| Example 8 | 0.30 | 1978 | 157 | 25 | 48 | 20 | Longitudinal | 40 nm | 110° C. |

| | Content of butyl stearate | | Ultrasonic vibration imparting conditions | | | Magnetic layer forming preparation conditions | | |
|---|---|---|---|---|---|---|---|---|
| | Magnetic layer forming composition | Non-magnetic layer forming composition | Imparting time | Frequency | Intensity | Number of times of passes of flow type ultrasonic dispersing device | Number of times of filtering | Filter hole diameter |
| Comparative Example 1 | 1.0 part | 4.0 part | None | None | None | 2 times | 1 time | 1.0 μm |
| Comparative Example 2 | 1.0 part | 4.0 part | None | None | None | 2 times | 1 time | 1.0 μm |
| Comparative Example 3 | 1.0 part | 4.0 part | None | None | None | 2 times | 1 time | 1.0 μm |
| Comparative Example 4 | 1.0 part | 4.0 part | None | None | None | 2 times | 1 time | 1.0 μm |
| Comparative Example 5 | 1.0 part | 4.0 part | None | None | None | 2 times | 1 time | 1.0 μm |
| Comparative Example 6 | 1.0 part | 4.0 part | None | None | None | 2 times | 1 time | 1.0 μm |
| Comparative Example 7 | 1.0 part | 4.0 part | None | None | None | 2 times | 1 time | 1.0 μm |
| Comparative Example 8 | 1.0 part | 4.0 part | None | None | None | 2 times | 1 time | 1.0 μm |
| Comparative Example 9 | 1.0 part | 4.0 part | 0.5 seconds | 30 kHz | 100 W | 2 times | 1 time | 1.0 μm |
| Comparative Example 10 | 1.0 part | 15.0 parts | 0.5 seconds | 30 kHz | 100 W | 1 time | 1 time | 1.0 μm |
| Comparative Example 11 | 0 part | 0 part | 0.5 seconds | 30 kHz | 100 W | 2 times | 1 time | 1.0 μm |
| Comparative Example 12 | 1.0 part | 4.0 parts | 0.5 seconds | 30 kHz | 100 W | 2 times | 1 time | 1.0 μm |
| Comparative Example 13 | 1.0 part | 4.0 parts | 0.5 seconds | 30 kHz | 100 W | 2 times | 1 time | 1.0 μm |
| Example 1 | 1.0 part | 4.0 parts | 0.5 seconds | 30 kHz | 100 W | 2 times | 1 time | 1.0 μm |
| Example 2 | 1.0 part | 4.0 parts | 0.5 seconds | 30 kHz | 100 W | 2 times | 1 time | 1.0 μm |
| Example 3 | 1.0 part | 4.0 parts | 0.5 seconds | 30 kHz | 100 W | 2 times | 1 time | 1.0 μm |
| Example 4 | 1.0 part | 4.0 parts | 0.5 seconds | 30 kHz | 100 W | 2 times | 1 time | 1.0 μm |
| Example 5 | 1.0 part | 4.0 parts | 0.5 seconds | 30 kHz | 100 W | 2 times | 1 time | 1.0 μm |
| Example 6 | 1.0 part | 4.0 parts | 3.0 seconds | 30 kHz | 100 W | 2 times | 1 time | 1.0 μm |
| Example 7 | 1.0 part | 4.0 parts | 0.5 seconds | 30 kHz | 100 W | 30 times | 5 times | 0.5 μm |
| Example 8 | 1.0 part | 4.0 parts | 3.0 seconds | 30 kHz | 100 W | 30 times | 5 times | 0.5 μm |

TABLE 1-2

| | Center line average surface roughness Ra measured regarding surface of magnetic layer | $S_{after} - S_{before}$ | $FWHM_{before}$ | $FWHM_{after}$ | $\Delta SFD$ | Servo head | SNR (dB) | Number of times of occurrence of decrease in resistance value (times) | Rate of decrease in resistance value (%) |
|---|---|---|---|---|---|---|---|---|---|
| Comparative Example 1 | 2.8 nm | 3.2 nm | 8.5 nm | 6.9 nm | 0.63 | GMR | 0 | 0 | 0 |
| Comparative Example 2 | 2.5 nm | 3.2 nm | 8.5 nm | 6.9 nm | 0.63 | GMR | 2.2 | 0 | 0 |
| Comparative Example 3 | 2.0 nm | 3.2 nm | 8.5 nm | 6.9 nm | 0.63 | GMR | 4.5 | 0 | 0 |
| Comparative Example 4 | 1.5 nm | 3.2 nm | 8.5 nm | 6.9 nm | 0.63 | GMR | 6.8 | 0 | 0 |
| Comparative Example 5 | 2.8 nm | 3.2 nm | 8.5 nm | 6.9 nm | 0.63 | TMR | 0.7 | 1 | — |
| Comparative Example 6 | 2.5 nm | 3.2 nm | 8.5 nm | 6.9 nm | 0.63 | TMR | 3.2 | 3 | — |
| Comparative Example 7 | 2.0 nm | 3.2 nm | 8.5 nm | 6.9 nm | 0.63 | TMR | 5.5 | 7 | — |
| Comparative Example 8 | 1.5 nm | 3.2 nm | 8.5 nm | 6.9 nm | 0.63 | TMR | 7.7 | 9 | — |
| Comparative Example 9 | 2.0 nm | 3.2 nm | 8.5 nm | 6.9 nm | 0.48 | TMR | 7.0 | 7 | — |
| Comparative Example 10 | 2.0 nm | 11.0 nm | 6.8 nm | 6.9 nm | 0.48 | TMR | 7.0 | — | — |
| Comparative Example 11 | 2.0 nm | 0 nm | 6.8 nm | 6.9 nm | 0.48 | TMR | 7.0 | — | — |
| Comparative Example 12 | 2.0 nm | 3.2 nm | 6.8 nm | 7.5 nm | 0.48 | TMR | 7.0 | 7 | — |
| Comparative Example 13 | 2.0 nm | 3.2 nm | 6.8 nm | 6.9 nm | 0.63 | TMR | 5.5 | 0 | 5 |
| Example 1 | 2.0 nm | 3.2 nm | 6.8 nm | 6.9 nm | 0.48 | TMR | 7.0 | 0 | 5 |
| Example 2 | 2.0 nm | 3.2 nm | 6.8 nm | 6.9 nm | 0.33 | TMR | 7.2 | 0 | 5 |
| Example 3 | 2.0 nm | 3.2 nm | 6.8 nm | 6.9 nm | 0.21 | TMR | 7.5 | 0 | 5 |

TABLE 1-2-continued

| | Center line average surface roughness Ra measured regarding surface of magnetic layer | $S_{after}-S_{before}$ | $FWHM_{before}$ | $FWHM_{after}$ | ΔSFD | Servo head | SNR (dB) | Number of times of occurrence of decrease in resistance value (times) | Rate of decrease in resistance value (%) |
|---|---|---|---|---|---|---|---|---|---|
| Example 4 | 2.0 nm | 3.2 nm | 6.8 nm | 6.9 nm | 0.16 | TMR | 7.3 | 0 | 5 |
| Example 5 | 2.0 nm | 3.2 nm | 6.8 nm | 6.9 nm | 0.05 | TMR | 7.2 | 0 | 5 |
| Example 6 | 2.0 nm | 3.2 nm | 4.1 nm | 6.9 nm | 0.21 | TMR | 7.5 | 0 | 4 |
| Example 7 | 2.0 nm | 3.2 nm | 6.8 nm | 4.0 nm | 0.21 | TMR | 7.5 | 0 | 2 |
| Example 8 | 1.5 nm | 3.2 nm | 4.1 nm | 4.0 nm | 0.21 | TMR | 9.3 | 0 | 11 |

As shown in Table 1, in Examples 1 to 8, the servo pattern could be read at a high SNR by using the TMR head as the servo head. In Examples 1 to 8, a significant decrease in resistance value of the TMR head could be prevented.

The invention is effective for usage of magnetic recording for which high-sensitivity reproducing of information recorded with high density is desired.

What is claimed is:

1. A magnetic tape device comprising:
a magnetic tape; and
a servo head,
wherein the servo head is a magnetic head including a tunnel magnetoresistance effect type element as a servo pattern reading element,
the magnetic tape includes a non-magnetic support, and a magnetic layer including ferromagnetic powder, a binding agent, and fatty acid ester on the non-magnetic support,
the magnetic layer includes a servo pattern,
a center line average surface roughness Ra measured regarding a surface of the magnetic layer is equal to or smaller than 2.0 nm,
a full width at half maximum of spacing distribution measured by optical interferometry regarding the surface of the magnetic layer before performing a vacuum heating with respect to the magnetic tape is greater than 0 nm and equal to or smaller than 7.0 nm,
a full width at half maximum of spacing distribution measured by optical interferometry regarding the surface of the magnetic layer after performing the vacuum heating with respect to the magnetic tape is greater than 0 nm and equal to or smaller than 7.0 nm,
a difference $S_{after}-S_{before}$ between a spacing $S_{after}$ measured by optical interferometry regarding the surface of the magnetic layer after performing the vacuum heating with respect to the magnetic tape and a spacing $S_{before}$ measured by optical interferometry regarding the surface of the magnetic layer before performing the vacuum heating with respect to the magnetic tape is greater than 0 nm and equal to or smaller than 8.0 nm, and
ΔSFD in a longitudinal direction of the magnetic tape calculated by Expression 1 is equal to or smaller than 0.50, $$\Delta SFD = SFD_{25°\ C.} - SFD_{-190°\ C.} \quad \text{Expression 1}$$

in Expression 1, the $SFD_{25°\ C.}$ is a switching field distribution SFD measured in a longitudinal direction of the magnetic tape at a temperature of 25° C., and the $SFD_{-190°\ C.}$ is a switching field distribution SFD measured in a longitudinal direction of the magnetic tape at a temperature of −190° C.

2. The magnetic tape device according to claim 1, wherein the full width at half maximum of spacing distribution measured by optical interferometry regarding the surface of the magnetic layer before performing the vacuum heating with respect to the magnetic tape is 3.0 nm to 7.0 nm.

3. The magnetic tape device according to claim 1, wherein the full width at half maximum of spacing distribution measured by optical interferometry regarding the surface of the magnetic layer after performing the vacuum heating with respect to the magnetic tape is 3.0 nm to 7.0 nm.

4. The magnetic tape device according to claim 1, wherein the difference $S_{after}-S_{before}$ is 2.0 nm to 8.0 nm.

5. The magnetic tape device according to claim 1, wherein the center line average surface roughness Ra measured regarding the surface of the magnetic layer is 1.2 nm to 2.0 nm.

6. The magnetic tape device according to claim 1, wherein the ΔSFD is 0.03 to 0.50.

7. The magnetic tape device according to claim 1, wherein the magnetic tape includes a non-magnetic layer including non-magnetic powder and a binding agent between the non-magnetic support and the magnetic layer.

8. A head tracking servo method comprising:
reading a servo pattern of a magnetic layer of a magnetic tape by a servo head in a magnetic tape device,
wherein the servo head is a magnetic head including a tunnel magnetoresistance effect type element as a servo pattern reading element,
the magnetic tape includes a non-magnetic support, and a magnetic layer including ferromagnetic powder, a binding agent, and fatty acid ester on the non-magnetic support,
the magnetic layer includes the servo pattern,
a center line average surface roughness Ra measured regarding a surface of the magnetic layer is equal to or smaller than 2.0 nm,
a full width at half maximum of spacing distribution measured by optical interferometry regarding the surface of the magnetic layer before performing a vacuum heating with respect to the magnetic tape is greater than 0 nm and equal to or smaller than 7.0 nm,
a full width at half maximum of spacing distribution measured by optical interferometry regarding the surface of the magnetic layer after performing the vacuum heating with respect to the magnetic tape is greater than 0 nm and equal to or smaller than 7.0 nm,
a difference $S_{after}-S_{before}$ between a spacing $S_{after}$ measured by optical interferometry regarding the surface of the magnetic layer after performing the vacuum heating with respect to the magnetic tape and a spacing $S_{before}$ measured by optical interferometry regarding the surface of the magnetic layer before performing the vacuum heating with respect to the magnetic tape is greater than 0 nm and equal to or smaller than 8.0 nm, and ΔSFD in a longitudinal direction of the magnetic tape calculated by Expression 1 is equal to or smaller than 0.50, $$\Delta SFD = SFD_{25°C} - SFD_{-190°C} \quad \text{Expression 1}$$

in Expression 1, the $SFD_{25°C}$ is a switching field distribution SFD measured in a longitudinal direction of the magnetic tape at a temperature of 25° C., and the $SFD_{-190°C}$ is a switching field distribution SFD measured in a longitudinal direction of the magnetic tape at a temperature of -190° C.

9. The head tracking servo method according to claim 8, wherein the full width at half maximum of spacing distribution measured by optical interferometry regarding the surface of the magnetic layer before performing the vacuum heating with respect to the magnetic tape is 3.0 nm to 7.0 nm.

10. The head tracking servo method according to claim 8, wherein the full width at half maximum of spacing distribution measured by optical interferometry regarding the surface of the magnetic layer after performing the vacuum heating with respect to the magnetic tape is 3.0 nm to 7.0 nm.

11. The head tracking servo method according to claim 8, wherein the difference $S_{after} - S_{before}$ is 2.0 nm to 8.0 nm.

12. The head tracking servo method according to claim 8, wherein the center line average surface roughness Ra measured regarding the surface of the magnetic layer is 1.2 nm to 2.0 nm.

13. The head tracking servo method according to claim 8, wherein the ΔSFD is 0.03 to 0.50.

14. The head tracking servo method according to claim 8, wherein the magnetic tape includes a non-magnetic layer including non-magnetic powder and a binding agent between the non-magnetic support and the magnetic layer.

* * * * *